(12) United States Patent
Tabor et al.

(10) Patent No.: US 6,989,065 B2
(45) Date of Patent: Jan. 24, 2006

(54) METHOD OF MANUFACTURING A FILAMENT FORMED REINFORCEMENT MEMBER AND A RUN FLAT TIRE SUPPORT THEREWITH

(75) Inventors: Rick L. Tabor, Gurnee, IL (US); Patricio Jimenez, Jr., Lake Jackson, TX (US); Wayne R. Wilkomm, Erie, CO (US); Ralph D. Priester, Jr., Lake Jackson, TX (US); Marty C. Cornell, Lake Jackson, TX (US); Chris P. Christenson, Beaverton, MI (US); Kimberly F. Bennett, West Columbia, TX (US); Peder E. Danielsen, Midland, MI (US); Jeffery D. Zawisza, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 178 days.

(21) Appl. No.: 09/947,997

(22) Filed: Sep. 6, 2001

(65) Prior Publication Data

US 2003/0000623 A1 Jan. 2, 2003

Related U.S. Application Data

(60) Provisional application No. 60/231,658, filed on Sep. 11, 2000, provisional application No. 60/289,958, filed on May 10, 2001, and provisional application No. 60/300,887, filed on Jun. 25, 2001.

(51) Int. Cl.
*B32B 31/00* (2006.01)
*B29D 30/04* (2006.01)
*B60C 17/00* (2006.01)
*B29C 45/00* (2006.01)

(52) U.S. Cl. .................... 156/145; 156/110.1; 152/516; 152/520; 152/157; 152/158; 264/271.1; 264/273; 264/275

(58) Field of Classification Search ................ 152/516, 152/520, 157, 158, 315; 156/166, 169, 170, 156/172, 173, 112, 113; 264/275
See application file for complete search history.

(56) References Cited

U.S. PATENT DOCUMENTS 3,414,491 A * 12/1968 Du Rose et al. ............ 205/278
3,578,547 A    5/1971 Wicker (Continued)

FOREIGN PATENT DOCUMENTS

DE         1290445      *  3/1969
DE          110839         1/1975

(Continued)

OTHER PUBLICATIONS

Mark, H.F., et al., "Encyclopedia of Polymer Science and Engineering," vol. 14, pp. 326–391 (1988), John Wiley & Sons, USA.

(Continued)

*Primary Examiner*—Jeff H. Aftergut
*Assistant Examiner*—Justin Fischer
(74) *Attorney, Agent, or Firm*—Locke Liddell & Sapp LLP

(57) ABSTRACT

The present invention provides a unitary run flat tire (RFT) reinforcement using filament material that is formed into a relatively rigid shape. The reinforcement is insertable into a mold for an RFT support and can maintain the needed structural rigidity for such insertion. Further, the invention provides an RFT support that is molded and includes the RFT reinforcement. The invention also provides a wheel assembly including a tire, a rim, and an RFT support between the rim and the tire, where the support includes the RFT reinforcement. The RFT support can have a colored indicator formed or subsequently applied thereto to indicate one or more attributes of the support.

10 Claims, 10 Drawing Sheets

U.S. PATENT DOCUMENTS

| | | | |
|---|---|---|---|
| 3,635,851 A | | 1/1972 | Hoeschele |
| 3,897,386 A | | 7/1975 | Sanda, Jr. |
| 3,915,937 A | | 10/1975 | O'Shea |
| 3,925,319 A | | 12/1975 | Hiatt et al. |
| 3,932,360 A | | 1/1976 | Cerankowski et al. |
| 3,935,329 A | | 1/1976 | Reilly et al. |
| 3,964,328 A | | 6/1976 | Redmond, Jr. |
| 3,976,114 A | | 8/1976 | Patecell |
| 3,979,547 A | | 9/1976 | Roberts, Jr. et al. |
| 4,081,429 A | | 3/1978 | Wyman et al. |
| 4,124,574 A | | 11/1978 | Preston et al. |
| 4,157,106 A | | 6/1979 | Cataldo |
| 4,157,107 A | | 6/1979 | Cataldo |
| 4,248,286 A | * | 2/1981 | Curtiss et al. ............... 152/158 |
| 4,281,700 A | | 8/1981 | Ross |
| 4,287,930 A | * | 9/1981 | McIntosh et al. ........... 152/526 |
| 4,295,513 A | * | 10/1981 | Lovell et al. ............... 152/563 |
| 4,334,565 A | | 6/1982 | Stokes |
| 4,346,747 A | | 8/1982 | Osada et al. |
| 4,408,694 A | | 10/1983 | Mueller |
| 4,461,333 A | | 7/1984 | Filliol et al. |
| 4,486,370 A | | 12/1984 | Bechara et al. |
| 4,486,561 A | | 12/1984 | Chung et al. |
| 4,487,869 A | | 12/1984 | Panush |
| 4,501,629 A | | 2/1985 | Satzler |
| 4,517,249 A | | 5/1985 | Panush |
| 4,530,386 A | | 7/1985 | Nakahira |
| 4,642,320 A | | 2/1987 | Turner et al. |
| 4,871,413 A | | 10/1989 | Hyodo et al. |
| 5,017,634 A | | 5/1991 | Falline et al. |
| 5,130,404 A | | 7/1992 | Freeland |
| 5,162,382 A | | 11/1992 | Carswell et al. |
| 5,247,018 A | | 9/1993 | Maeda et al. |
| 5,300,164 A | | 4/1994 | DeTrano et al. |
| 5,320,369 A | | 6/1994 | Bears |
| 5,326,344 A | | 7/1994 | Bramm et al. |
| 5,361,817 A | | 11/1994 | Chen |
| 5,363,894 A | | 11/1994 | Gouttebessis et al. |
| 5,384,161 A | | 1/1995 | Eisfeller et al. |
| 5,435,363 A | | 7/1995 | Pender |
| 5,450,887 A | | 9/1995 | Habay et al. |
| 5,525,681 A | | 6/1996 | Barron et al. |
| 5,556,677 A | | 9/1996 | Quigley et al. |
| 5,580,626 A | | 12/1996 | Quigley et al. |
| 5,591,283 A | | 1/1997 | Mahling |
| 5,626,696 A | | 5/1997 | Boni et al. |
| 5,634,993 A | | 6/1997 | Drieux et al. |
| 5,787,950 A | | 8/1998 | Muhlhoff et al. |
| 5,800,643 A | | 9/1998 | Frankowski |
| 5,868,190 A | | 2/1999 | Williard, Jr. et al. |
| 5,891,279 A | * | 4/1999 | Lacour ....................... 152/520 |
| 5,968,294 A | | 10/1999 | Williard, Jr. et al. |
| 5,975,171 A | | 11/1999 | Rivaton |
| 6,093,271 A | | 7/2000 | Majumdar |
| 6,150,019 A | | 11/2000 | Smith et al. |
| 6,286,574 B1 | | 9/2001 | Michelot et al. |
| 6,321,808 B1 | * | 11/2001 | Spragg et al. ............... 152/516 |
| 6,387,311 B1 | * | 5/2002 | Lacour et al. ............... 264/229 |
| 6,463,972 B1 | * | 10/2002 | Lacour ....................... 152/158 |
| 6,494,543 B1 | | 12/2002 | Hashimura et al. |
| 6,548,616 B1 | | 4/2003 | Schrock et al. |
| 6,561,244 B2 | | 5/2003 | Zanzig et al. |
| 6,764,634 B2 | * | 7/2004 | Demin ....................... 264/275 |

FOREIGN PATENT DOCUMENTS

| | | | |
|---|---|---|---|
| DE | 2355308 | * | 5/1975 |
| DE | 25 53 839 | | 12/1976 |
| DE | 19728601 | | 1/1999 |
| EP | 0 228 190 B1 | | 7/1987 |
| EP | 0 254 193 B1 | | 1/1988 |
| EP | 0 415 368 B1 | | 3/1991 |
| EP | 0 513 964 A2 | | 11/1992 |
| EP | 0 564 267 A2 | | 10/1993 |
| EP | 0 613 962 B1 | | 9/1994 |
| EP | 0 617 066 B1 | | 9/1994 |
| EP | 0 666 875 B1 | | 8/1995 |
| EP | 0721854 | * | 7/1996 |
| EP | 0 769 527 A1 | | 4/1997 |
| EP | 0 800 913 A1 | | 10/1997 |
| EP | 0 837 014 A1 | | 4/1998 |
| EP | 0 985 507 A1 | | 3/2000 |
| FR | 2639880 | | 6/1990 |
| GB | 1359462 | | 7/1974 |
| GB | 2040837 | | 9/1980 |
| JP | 94106556 A | | 4/1994 |
| JP | 98184807 A | | 7/1998 |
| JP | S63-270783 | | 8/1998 |
| JP | 00250328 A | | 9/2000 |
| WO | WO 94/10213 | | 5/1994 |
| WO | WO 01/42000 A1 | | 6/2001 |

OTHER PUBLICATIONS

Sadowski, J.S., et al., "Polyurethane Latexes for Coagulation Dipping," Elastomerics (Aug. 1978), Canada.

Tickle, John D. "Current Capabilities of Reinforced Plastic Pultrusion," SAE (1973), Canada.

Yates, Clyde I., "Continuous Filament Reinforced Thermoplastics," Aerosp. Syst. Group (1972), USA.

Waring, L.A.R., "Reinforcement," pp. 121–145, Glass Reinf. Plast., $4^{th}$ Ed. (1970); USA.

Lin, H., "Filament Winding: Its Progress and Future in the Aerospace Industry," Plastics & Polymers (Jun. 1968), Great Britain.

Tempil, Inc., Temp–Alarm® Time/Temperature Signaling Paint (website Aug. 2001); U.S.A.

Samkwang Corporation, Thermo Paint (website Aug. 2001); U.S.A.

Air Free Tires, Inc., SnakeCharmer (website Aug. 2001), U.S.A.

University of Buffalo, Filament Winding, Schematic (website Aug. 2001), U.S.A.

Sidewinder, Sidewinder Filament Winding Systems (website Aug. 2001), U.S.A.

Entec Composite Machines, Inc., Tape Wrappers (website Aug. 2001), U.S.A.

Entec Composite Machines, Inc., Machinery, FW2000ob Series (website Aug. 2001), U.S.A.

Pultrex Limited, Filament Winding Machines (website Aug. 2001), ENGLAND.

COMAT, Composite Materials GMBH (website May 2001), GERMANY.

The Dow Chemical Company, Fabricating Tips: DERAKANE Epoxy Vinyl Ester Resins (revised edition Oct. 1994), U.S.A.

* cited by examiner

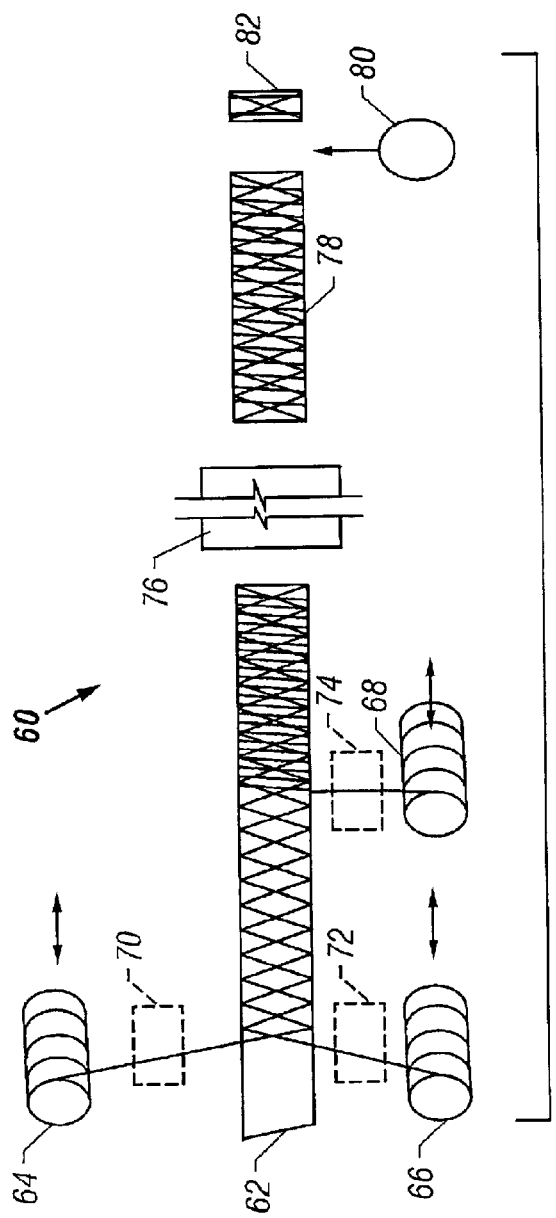
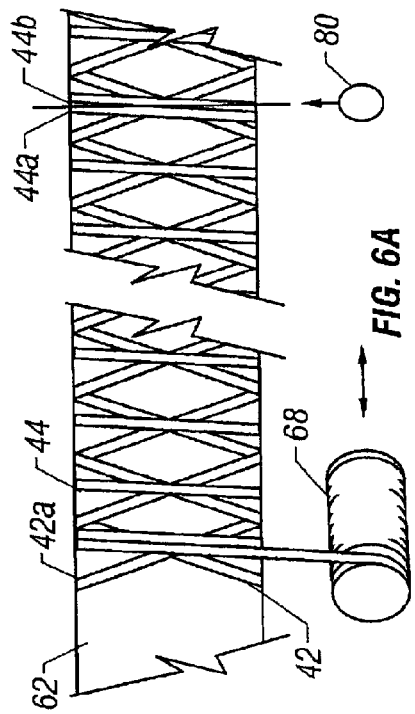
FIG. 6
FIG. 6A

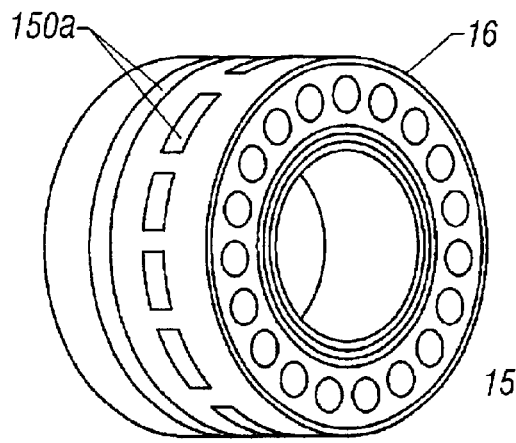
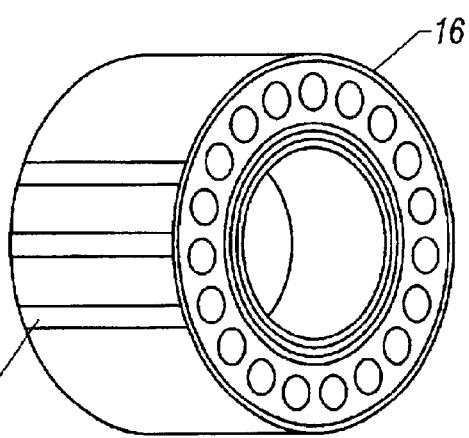
FIG. 12A  FIG. 12B
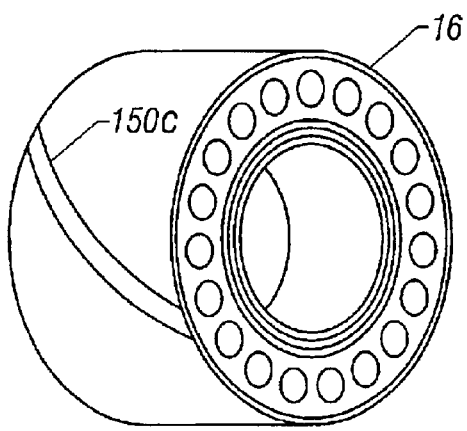
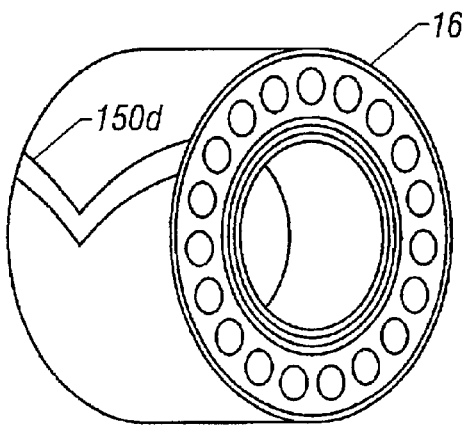
FIG. 12C  FIG. 12D
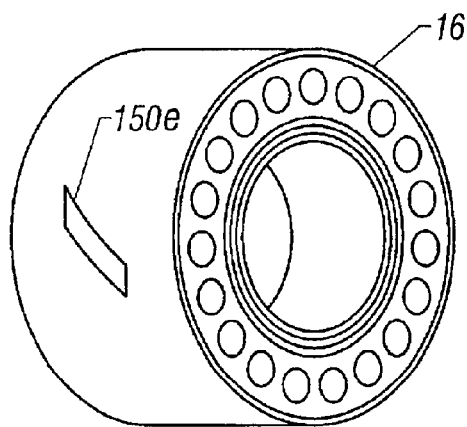
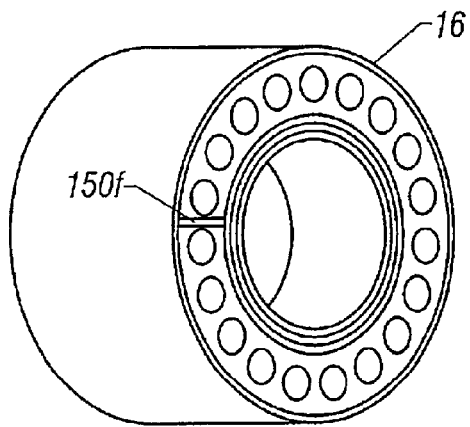
FIG. 12E  FIG. 12F

METHOD OF MANUFACTURING A FILAMENT FORMED REINFORCEMENT MEMBER AND A RUN FLAT TIRE SUPPORT THEREWITH

This application claims the benefit of U.S. Provisional Application Ser. No. 60/231,658, filed Sep. 11, 2000; Ser. No. 60/289,958, filed May 10, 2001; and Ser. No. 60/300,887, filed Jun. 25, 2001, all incorporated herein by reference.

FIELD OF THE INVENTION

The field of invention relates to pneumatic tires. The invention particularly relates to run flat tire supports for pneumatic tires.

BACKGROUND OF THE INVENTION

In past years, the automotive industry has provided spare tires for replacement of punctured or blown out tires while traveling. However, efforts have been made to eliminate the need for the spare tire by providing improved designs for tires. Specifically, efforts have been made to provide a stable and economical tire that can run with little or no pressure when, for example, the tire is flat. The term for the efforts has become known as "run flat tire" (RFT) technology. The RFT concept allows an operator to continue driving or rolling for an extended period of time without stopping to replace the tire or seeking emergency assistance. A tire can be repaired at a later, more convenient time.

One embodiment of an RFT wheel assembly includes a rim, a tire mounted on the rim, and a support sandwiched between an inner surface of the tire and an outer peripheral surface of a rim. The support allows the tire to deflect a limited amount so that the tire does not separate from the rim along each edge of the tire.

A synthetic material, such as a polymer, is typically used for the support. A challenge in manufacturing the support is to provide adequate structural integrity to have sufficient strength, so that outwardly directed centrifugal forces do not substantially deform the RFT support during rotational use. Further, the support needs to be able to support the weight of the vehicle on the tire, when the tire contacts the support as the tire rolls. The structural integrity is balanced with structural flexibility, in that the support is typically deformed slightly to insert the support into the tire prior to mounting the tire to the rim.

The process of producing an RFT support typically involves some type of molding. A mold for the support can include a narrow channel of about three millimeters (mm) in width that is formed about an inner or outer periphery of the mold. The polymer support can be reinforced to help maintain its structural integrity during adverse conditions by providing a reinforcement in the molding process. The reinforcement is placed in the channel prior to molding and the polymer typically flows therethrough to encapsulate the reinforcement into the molded RFT support.

To support cost effective production, the speed and efficiency in which the RFT reinforcement can be manufactured and placed into the mold to create an RFT support is important. Prior to the present invention, there did not appear to be a profitable production method of manufacturing RFT reinforcements that were suitable for quick placement.

Prior efforts have focused on using a mesh of reinforcement material, typically known as a woven "scrim" cloth, that is wound multiple times around a mandrel into a cylindrical shape and then cut and removed from the mandrel. The number of layers is at least partially determined by an amount of reinforcement resistance to deflection desired, as an indication of strength, with more layers providing more strength when other parameters are constant. The scrim cloth reinforcement, in multiple layers, is then "stuffed" into the mold channel and the polymer flowed into the mold.

However, use of standardized scrim cloth can lead to increased manufacturing complexities. For example, generally multiple layers of cloth are needed to form the RFT reinforcement. The layers need to be sufficiently coupled together, so that they do not delaminate. Further, the reinforcement insertion time can be relatively long, if the reinforcement is so flexible that it does not have a stable shape or a compact thickness for ease of insertion into the channel. Still further, molding material generally flows through openings in the reinforcement during production of the support. It is generally beneficial to align openings in the several layers of mesh, so that molding material can readily flow through the openings. Aligning the several layers of openings can add complexities to the process and tooling. Also, the flexible cloth-type of reinforcement is generally produced in individual units and adds cost to the support.

Other factors can also affect the production efficiency. Material, especially fibrous material, can have an expanded thickness called "loft," where individual fibers can be spaced apart from adjacent fibers. Loft can cause difficulty in inserting the material into narrow mold cavities. Also, multiple layers of scrim cloth or other reinforcement material can add difficulties in inserting the multiple layers into the mold, if the layers are decoupled from each other or become delaminated during use.

Therefore, there remains a need for an improved RFT support reinforcement and RFT support, where the reinforcement can be readily inserted into a support mold and still be cost efficient to manufacture and where the manufactured product can be readily identified. A stable, relatively rigid reinforcement is needed to allow consistent placement of the reinforcement in an automated or manual process.

SUMMARY OF THE INVENTION

The present invention provides a unitary run flat tire (RFT) support reinforcement that is formed from a filament material into a relatively rigid shape. Generally, the unitary RFT support reinforcement can be formed from multiple layers that are coupled together, such as with an adhesive, to form one effective layer. The one effective layer can include layers of filaments wound into a reinforcement. The reinforcement is insertable into a mold for an RFT support and can maintain the needed structural rigidity for such insertion. The RFT reinforcement can have a rigidity sufficient to deform about 20% or less when dropped from about two meters high to a hard surface when an axis of the RFT reinforcement is substantially perpendicular to gravity.

Further, the invention provides an RFT support that is molded and includes the RFT reinforcement. The invention also provides a wheel assembly including a tire, a rim, and an RFT support between the rim and the tire, where the support includes the RFT reinforcement. The RFT support can have a colored indicator formed or subsequently applied thereto to indicate one or more attributes of the support.

A method of manufacturing an RFT support is also provided, comprising placing at least one RFT reinforcement into a portion of an RFT support mold, the reinforcement being formed from one or more filaments and being unitary and having a rigidity sufficient to deform about 20% or less when dropped from about two meters high to a hard surface when an axis of the RFT reinforcement is substantially perpendicular to gravity; injecting a moldable elastomer or elastomer-forming material into the mold; flowing the moldable material through at least a portion of the reinforcement; and allowing the moldable material to at least partially solidify to form the RFT support.

A method of manufacturing an RFT reinforcement is also provided, comprising forming one or more filaments around a mandrel; coupling at least one portion of the one or more filaments to another portion of the filaments to form a tubular member; and optionally cutting the tubular member into cylindrical sections; thereby forming at least one unitary RFT reinforcement having one effective layer.

BRIEF DESCRIPTION OF THE DRAWINGS

FIG. 6 is a schematic view of one system for producing a filament wound RFT reinforcement.

FIG. 6a is a detailed schematic of one embodiment of transverse members and circumferential members and associated winding.

FIGS. 12a–12f is a schematic perspective view of exemplary colored indicators on a RFT support.

DETAILED DESCRIPTION OF THE INVENTION

The present invention generally includes a run flat tire (RFT) reinforcement, an RFT support including the RFT reinforcement, and a wheel assembly including the RFT support, tire, and rim. Further, the invention includes methods of manufacturing the RFT support and reinforcement.

Figure 1:
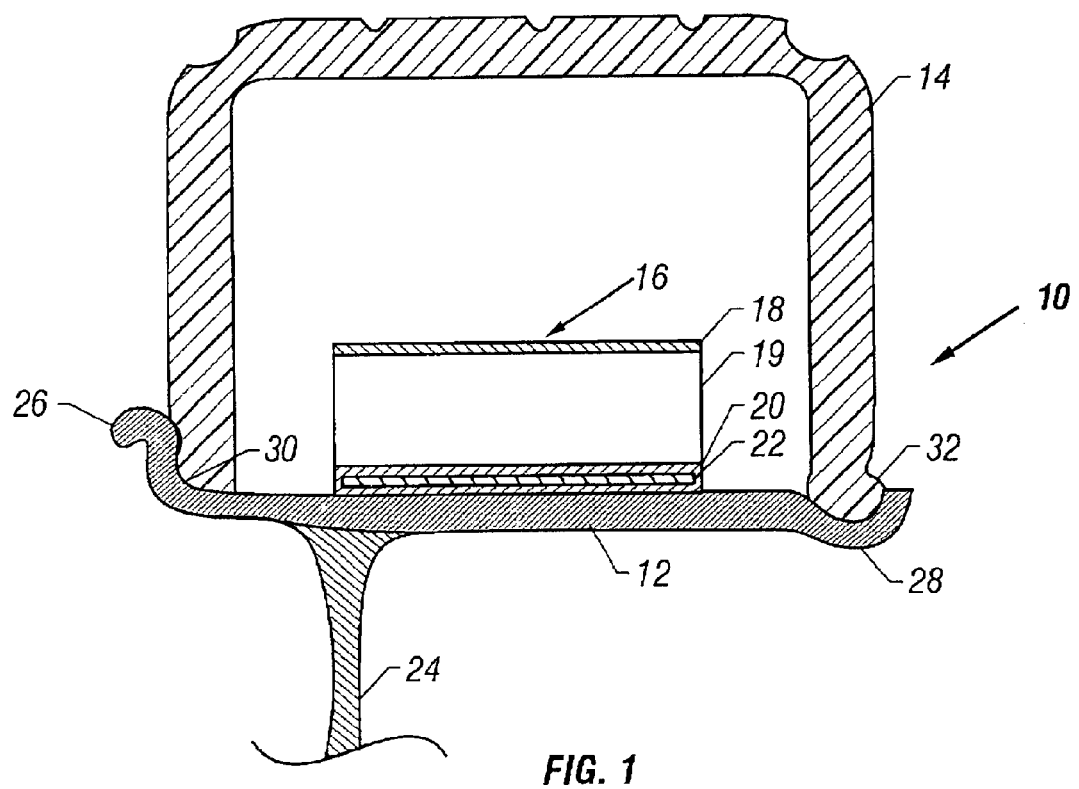
FIG. 1 is a schematic partial cross sectional view of a wheel assembly.

FIG. 1 is a schematic partial cross sectional view of a wheel assembly. A wheel assembly 10 includes a rim 12, a tire 14 mounted on the rim, and an RFT support 16 mounted between an inner peripheral surface of the tire and an outer peripheral surface of the rim. In some embodiments, the rim 12 can include a center support 24 which allows attachment of the wheel assembly 10 to a vehicle (not shown). The center support 24 can generally can be a web, spokes, or other attachment element, and can include a separate multipiece element, as is known in the commercial trucking industry for wheel assemblies. The rim 12 also includes a first rim flange 26 and a second rim flange 28. The outer diameter of the RFT support 16 is generally the same or greater than the inner diameter of the tire 14 at the beads 30 and 32. The RFT support 16 is generally compressed circumferentially in at least one direction to an elliptical shape so that the RFT support can be inserted within the tire 14 generally prior to insertion of the RFT support onto the rim 12. Thus, the support 16 should be relatively rigid to support a load of the tire in an underinflated condition, but is also sufficiently flexible to allow changing the shape for installation. The materials for the RFT support are discussed in reference to FIG. 2.

The RFT support 16 includes an outer hoop 18, and inner hoop 20, and a center web 19 disposed therebetween. Further, the RFT support 16 includes at least one RFT reinforcement 22 molded therein. The RFT support can have a colored indicator on one or more of the RFT support surfaces as described more fully in reference to FIGS. 11–12.

The RFT Support

Figure 2:
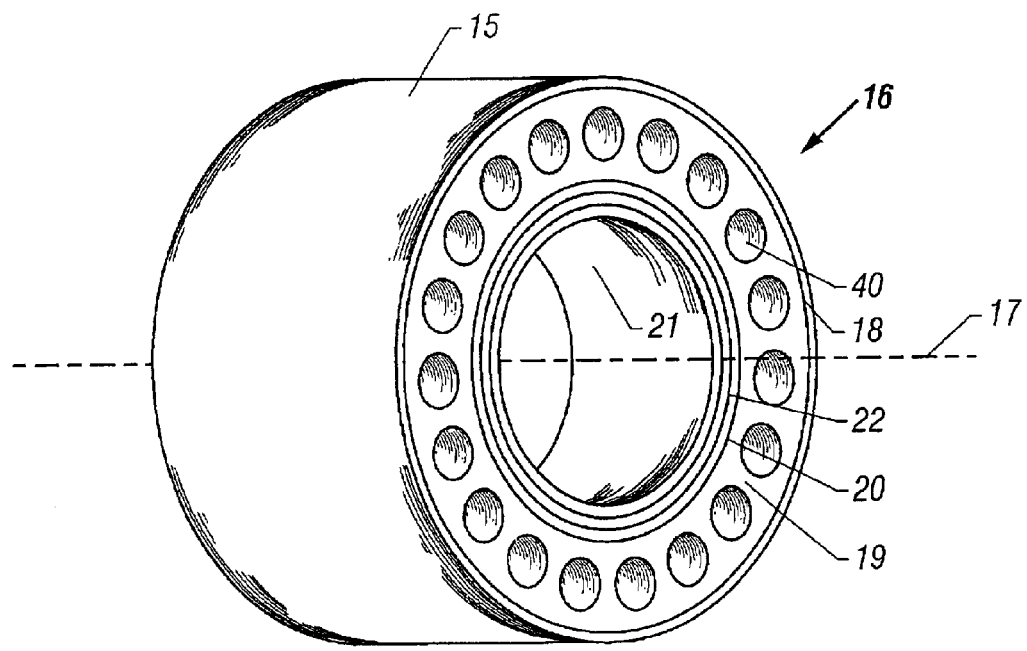
FIG. 2 is a perspective schematic view of an RFT support.

FIG. 2 is a perspective schematic view of an RFT support 16, shown in FIG. 1. The RFT support 16 includes in one embodiment an outer hoop 18 generally having a tire support surface 15 for the tire 14 that is shown in FIG. 1, an inner hoop 20 generally having a rim support surface 21 for the rim 12 that is also shown in FIG. 1, and a center web 19 disposed therebetween.

At least one RFT reinforcement 22 is molded into the RFT support. Generally, the RFT reinforcement is molded into the inner hoop 20, although the reinforcement could be molded in other areas of the support, including the outer hoop 18 and the center web 19. Further, multiple RFT reinforcements can be molded at more than one position in the RFT support. For example, multiple RFT reinforcements could be molded at either different diametrical spacings or different lateral spacings, such as side-by-side, in the RFT support.

Generally, the RFT reinforcement is formed into a unitary member, in that, the reinforcement is a substantially continuous member, such as a cylinder, having one effective layer prior to inserting the reinforcement in a mold for molding. If the RFT reinforcement is formed from a plurality of elements or layers, then generally the elements or layers are coupled together through mechanical attachment, chemical attachment, such as with coatings that would include binders, adhesives, and other substances that cause adherence between at least two elements or layers, or other methods that would join such portions together to form one effective layer. The reinforcement does not need coupling around the entire periphery to be considered having "one effective layer" for the purposes of this invention. Rather, such term is defined functionally, in that the reinforcement is coupled together sufficiently, so that it can be held together without substantial delamination, as described herein. Advantageously, the reinforcement can be coupled around at least the majority of its periphery. Generally, the coupling of the multiple layers together should be sufficient to remain intact during customary handling procedures of a manufacturing process, so that the layers do not delaminate. Delamination can cause delays in a manufacturing process during insertion of the reinforced member into the RFT support mold.

The loft of the material used in the RFT reinforcement can be reduced in some embodiments, especially when a coating is used to reduce the thickness of the material and/or to retain fibers to adjacent fibers. The thinner material can assist in placement in a mold. The reinforcement 22 assists in resisting crack propagation in the RFT support and otherwise contributes to the structural integrity of the support 16, particularly when the support 16 is mounted on the rim 12, shown in FIG. 1, and placed in use.

The center web 19 can include openings 40 to achieve weight reduction and material savings. The openings 40 can be any geometric shape and generally are round, elliptical, square, triangular, rectangular, parallelogram, rhombus, or diamond shaped. The center web 19 can be made of a flexible material to allow flexing of the support for installation in the wheel assembly 10, described in reference to FIG. 1.

The support 16 can be formed through molding and one embodiment is formed through reaction injection molding (RIM), a technique known to those with ordinary skill in the art. For the purposes of this disclosure, RIM can also include, without limitation, variations such as structural reaction injection molding (SRIM) and reinforced reaction injection molding (RRIM). Other methods can include resin transfer molding (RTM), thermoplastic injection molding, blow molding, rotational molding, foam molding, bead foam molding, compression molding, profile extrusion, and spin casting. These various techniques are known in the industry for producing molded parts. The material for the RFT support can be any moldable material. Suitable materials for use in preparing these RFT supports include, for example, the classes of thermoplastic elastomers commercially available according to the "Handbook of Thermoplastic Elastomers," 2nd Edition, edited by B. M. Walker and Charles P. Rader, Van Nostrand Reinhold, New York, 1988. These are: styrenic block copolymers; rubber-polyolefin blends; elastomeric alloys; thermoplastic polyurethanes; thermoplastic copolyesters; and thermoplastic polyamides. Under the category of elastomeric alloys, there are thermoplastic vulcanizates (TPVs) and melt processable rubbers (MPRs). Other useful materials can include polyvinyl chloride; polyethylene copolymers (including ethylene/styrene copolymers via constrained geometry catalysis); hydrogenated styrene block copolymers; polylactic acid polymers; and ethylene/carbon monoxide copolymers.

There are also a number of thermosetting or vulcanizable elastomers commercially available according to "Rubber Technology," 3rd Edition, edited by M. Morton, Kluwer Academic Publishers, Boston, 1999 which can be used to prepare the RFT supports. These elastomers include natural rubber (cis-1,4-polyisoprene); styrene-butadiene rubbers; polybutadiene rubbers; polyisoprene rubbers; ethylene-propylene rubbers, polychloroprene polymers; chlorinated polyethylene; chlorosulfonated polyethylene; silicone rubbers; flurocarbon elastomers; polyurethane elastomers; polysulfide elastomers; hydrogenated nitrile rubbers; propylene oxide polymers (vulcanizable copolymers of PO and allyl glycidyl ether); epichlorohydrin polymers; and ethylene acrylic elastomers (ethylene/methyl acrylate/carboxylic acid containing monomer terpolymers). Another material is polycoprolactam/polyether copolymers, such as NYRIM®. Curing, as appropriate, can be accomplished through self-cure, catalytically induced cure, thermal cure, photo sensitive cure, free radically initiated cure, actinic cure, such as X-ray cure, electron beam cure, microwave cure, and other cures known to those of ordinary skill in the art.

Further, exemplary polyurethanes suitable for the RFT support can include at least one polyol, at least one chain extender, and at least one isocyanate. Such polyurethanes include those materials cited and prepared in accordance the disclosure in PCT application WO 01/42000, by The Dow Chemical Company of Midland, Mich., USA, the assignee of the present invention.

PCT publication WO 01/42000 describes polyurethane-polymer compositions that are useful for making a lightweight tire support. Example 1 of this PCT publication describes one composition that can be particularly useful, although other materials can be used. In Example 1, a polyurethane-polymer composition was prepared by admixing a polyol-side stream and an isocyanate-side stream using reaction injection molding.

The polyol-side stream included a polyol formulation. The polyol formulation included a polyol in an amount of 54.81 weight percent, a chain extender in an amount of 44.84 weight percent, a surfactant in an amount of 0.25 weight percent, and a catalyst in an amount of 0.1 weight percent.

For the polyol formulation, the polyol was an ethylene-oxide capped 5,000 molecular-weight triol having a maximum unsaturation of 0.035 milliequivalents per gram of the total composition (available from The Dow Chemical Company, Freeport, Tex.). The chain extender was diethyl toluene diamine (a mixture of 3,5-diethyl-2,4- and 2,6'-toluene diamines) (available from The Dow Chemical Company, Freeport, Tex.). The surfactant was a silicone surfactant (L-1000; available from OSI Specialties/Witco Corp., Chicago, Ill.). The catalyst included a 50:50 combination of triethylene diamine (Dabco 3LV) (available from Air Products and Chemicals, Inc., Allentown, Pa.) and dibutyl tin dilaurate (Fomrez UL28) (available from Witco Chemical Co., Chicago, Ill.)

The isocyanate-side stream included a prepolymer formulation. The prepolymer formulation included a first isocyanate in an amount of 31.83 weight percent, a polyol in an amount of 63.17 weight percent, and a second isocyanate in an amount of 5.0 weight percent.

For the prepolymer formulation, the first isocyanate was 98 percent pure p,p'-MDI (Isonate 125M) (available from The Dow Chemical Company, Freeport, Tex.). The polyol was an ethylene-oxide capped (15 percent) 6,000 molecular-weight triol with a maximum unsaturation of 0.02 milliequivalent per gram of total composition (available from Asahi). And the second isocyanate was 50 percent p,p'-MDI and 50 percent o,p-MDI (Isonate 50 OP) (available from The Dow Chemical Company, Freeport, Tex.).

The isocyanate-side stream and the polyol-side stream were combined in a weight-ratio blend of 2:15:1 (isocyanate to polyol) using standard reaction-injection-molding processing conditions.

One skilled in the art will recognize that the formulation in this example can vary for the purposes of the present invention. For example, testing conditions, tolerances in formulation of raw materials, and variances with processing can alter the composition within acceptable ranges. Further, the formulation can be modified to alter properties of the tire support, such as but not limited to, altering the ratio of chain extender and polyol, eliminating a second isocyanate, and using polyols that are not ethylene-oxide capped. Still further, the ranges given in the PCT publication WO 01/42000 can also produce other suitable formulations.

Figure 3:
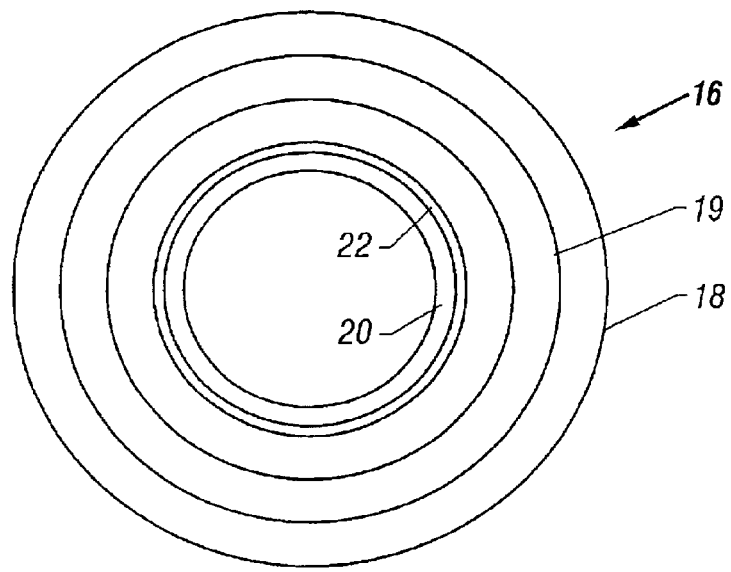
FIG. 3 is a schematic side view of another embodiment of the RFT support.

FIG. 3 is a schematic side view of another embodiment of the RFT support. The RFT support 16 in the embodiment shown in FIG. 3 includes a set of components that can be molded in separate operations. The RFT support 16 includes an outer hoop 18, a center web 19, and an inner hoop 20, which in at least one embodiment includes an RFT reinforcement 22. In some embodiments, the hoops and/or web can be formed from one or more thermoplastic foams, such as elastomer bead foams. Optionally, the hoops and/or web can be unfoamed. For example, the inner hoop 20 can be formed of a dynamic thermoplastic foam.

The density can be controlled to provide a relatively rigid inner hoop. The RFT reinforcement 22 can be formed of a fibrous or other suitable material and, in at least one embodiment, is coupled to the inner hoop by being affixed or molded therein. The center web 19 can be formed of a lower density dynamic thermoplastic foam. The center web 19 can optionally contain load bearing optimized openings (not shown) for weight reduction. The outer hoop 18 can be a higher density dynamic thermoplastic foam. The combination can provide sufficient strength to the inner surfaces, such as the inner hoop 20, and still be sufficient to allow the shape to change as needed for installation of the RFT support into the tire 14 and onto the rim 12, as shown in FIG. 1.

The hoops and/or web can be molded using a conventional molding, such as foam or bead foam molding techniques known to those with ordinary skill in the art. For example, a portion of the inner hoop 20 can be formed and an RFT reinforcement 22 placed around the portion to form the inner hoop. The inner hoop 20 can optionally be prepared using a profile extrusion system. The inner hoop 20 could be reinforced by the RFT reinforcement 22 molded therein. The center web 19 can be molded around the inner hoop 20 and the RFT reinforcement 22. The outer hoop 18 can be molded around the center web 19.

One skilled in the art having read this specification would understand that the RFT reinforcement 22 can be disposed in other positions in the RFT support 16. For example, the RFT reinforcement can be disposed or otherwise formed in or adjacent to the outer hoop 18 or the center web 19.

RFT Reinforcement

Figure 4:
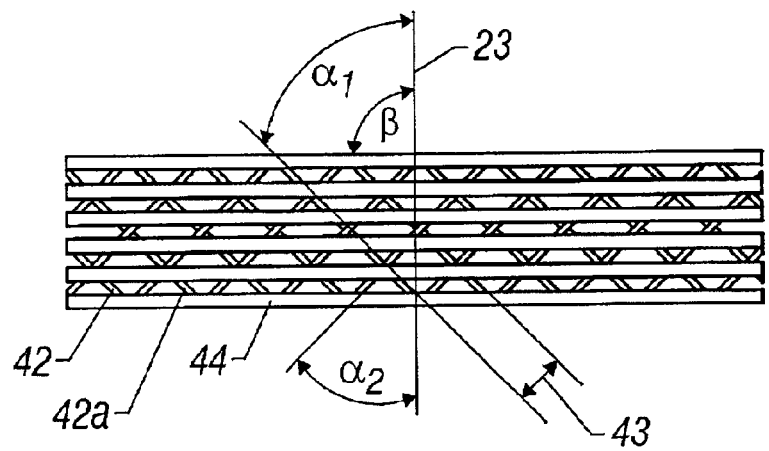
FIG. 4 is a schematic view of an RFT reinforcement.

FIG. 4 is a schematic view of an exemplary rigid, unitary RFT reinforcement. The RFT reinforcement 22 generally includes at least one transverse member 42. In the embodiment shown, a second transverse member 42a intercepts the transverse member 42. Further, the reinforcement 22 can include at least one substantially circumferential member 44. In at least one embodiment, the transverse members 42, 42a can be wound symmetrically, that is, at similar angles with respect to a center axis 23. Transverse angles $\alpha_1$, $\alpha_2$ can be used to describe the angle of the transverse members 42, 42a, respectively, relative to the center axis 23. In one embodiment, the transverse angles can be more than about 0 degrees to less than about 90 degrees, and advantageously about 70 degrees to about 80 degrees, such as about 78 degrees. Alternatively, the angles can be different from each other. One exemplary spacing 43 between adjacent transverse members can be about 20 mm to about 30 mm, such as about 24 mm. The transverse members can be a variety of widths and in at least one embodiment can be between about 2 mm to about 5 mm, such as about 3 mm.

Similarly, in at least one embodiment, the circumferential members 44 can be a width generally of about 2 mm to about 10 mm, such as between about 5 mm to about 8 mm. The circumferential members can be equally or non-equally spaced across a width of the RFT reinforcement of about 70 mm to about 120 mm, such as about 90 mm. A circumferential angle $\beta$ can be used to describe the angle of the circumferential member(s) and generally is a large angle, that is, almost perpendicular to the axis 23, although any angle between about 0 degrees and about 90 degrees can be used. In at least one embodiment, the angle $\beta$ can be between about 80 degrees to about 90 degrees.

It would be understood to one with ordinary skill in the art that the above dimensions are exemplary and the angles, uniform and nonuniform spacings, sizes, number of members and other dimensions can all vary depending on various design parameters, such as materials, desired rigidity, ease of assembly, costs, and strength. Further, the transverse members and circumferential members can be formed for different filaments or from a common filament, as described below regarding FIG. 6.

The RFT reinforcement of the present invention advantageously has a higher rigidity than found in prior efforts. The higher rigidity allows the reinforcement to be manually or automatically handled and to be placed relatively quickly in position in an RFT support mold. The speed and efficiency improves the productivity of an RFT support which should, in turn, allow for the economic production of the mass quantities of supports required for the transportation market.

A prior art RFT reinforcement comprising multiple layers of a scrim cloth took about 45 seconds to place in an RFT support mold in one comparative test. In contrast, some tests using at least one embodiment of the RFT reinforcement disclosed herein took about 10–15 seconds or less to place in the mold, that is, less than one-third of the time using the prior art. Even more advantageously, the tests showed that it was possible to reduce the time to about 2–5 seconds or less and generally about 3 seconds or less, that is, about an order of magnitude difference in time from the prior art.

Initial tests were conducted in manually placing the RFT reinforcement described herein in the mold. Automatic placement can also benefit using the RFT reinforcement described herein, for example and without limitation, through robotic placement or other automatic or semi-automatic placement systems.

The RFT reinforcement can also contain openings 46 formed therethrough. The openings allow liquid reactants to penetrate the reinforcement during the molding process of the RFT support, so that the reinforcement becomes an integral part of the RFT support when the liquid reactants solidify. Preferably, the reinforcement is substantially encapsulated by the polymer.

The RFT reinforcement can be made from a variety of moldable and metallic materials. For example, the transverse members and/or circumferential members can be made of fiberglass, carbon/graphite fibers, aramid fibers, polyester fibers, metal fibers and other materials. The types of fibers can be combined into composites to include combinations of glass, carbon/graphite, aramid, polyester, metal and other materials. The material can include metallic cloth materials, such as wire mesh, or solid rings. The fibers can additionally include a binder, sizing, dressing, or other coating to facilitate processing, binding or heat sealing of the fibers.

The individual fibers can be formed into filaments or tape. The fibers can be cut into discrete layers to produce cut fibers and can be included in a moldable material. In this disclosure, the term "filament" is used broadly and includes ribbons, fibers, tapes, yarn, tow, roving, and other individual, or groups of, materials to be wound about the mandrel. Unless explicitly stated herein, the term "mandrel" includes a member around which the filaments or other material are wound or formed. The mandrel can be reused for subsequent winding or forming, or can be integrated into the RFT reinforcement and/or RFT support in the processing of the same, for example, by cutting the member as a portion of the RFT support or RFT reinforcement. A collapsible mandrel can be used to advantage to facilitate the removal of the RFT reinforcement.

Additional materials for the reinforcement can include thin strands of wire woven into the material. Further, the reinforcement can be made from sheets, and in some embodiments laminated sheets. The RFT reinforcement can also be made of reinforced thermoplastic containing fibers. For example, the fiber composition of the thermoplastic can range from about 20% to about 99%, although other percentages are possible. Generally, the RFT reinforcement comprises a weight per square meter of about 50 grams to about 1000 grams per square meter.

An important aspect is that the reinforcement be sufficiently rigid to allow relatively quick and easy insertion into the mold and still be sufficiently flexible to allow compression of the RFT support for installation of the RFT support into the wheel assembly, shown in FIG. 1. Further, the reinforcement can be sufficiently rigid to help provide structural resistance to the otherwise outward expansion of the molded support during rotation and the accompanying outward centrifugal forces, such that the support substantially maintains its structural integrity during its intended use. For purposes herein, such stiffness will be referred to as "hoop stiffness," that is, the ability to resist an outward expansion due to rotating radial forces.

To increase hoop stiffness, the fibers can have a coating applied through spraying, dipping, encapsulating, extruding, impregnating, combining with films, or other methods known to those in the art that are available before or after the fibers are formed into an appropriate shape for the RFT reinforcement to produce a self-supporting structure that is capable of not collapsing when the structure is without external supports. Further, the reinforcement material could be dipped in a coagulation dip coating prior to forming around a mandrel and a relatively rigid polymer could be applied to act as an aqueous dispersant to provide suitable the self-supporting structure. The reinforcement preferably advantageously has a balanced weight distribution around the reinforcement periphery to assist the centrifugal balance of the final RFT support during driving conditions.

The RFT reinforcement can be made in individual units or can be made as a tubular member and one or more reinforcement units cut from the tubular member. The RFT reinforcement can be filament wound about a mandrel. Alternatively, the RFT reinforcement can be made from prepared cloth or sheets that are rolled into a desired shape and the ends or other portions of the material coupled to each other. The term "coupled," "coupling," and like terms as used herein includes adhering, bonding, binding, curing, fastening, attaching, and other forms of securing one piece to another piece.

Figure 5A:
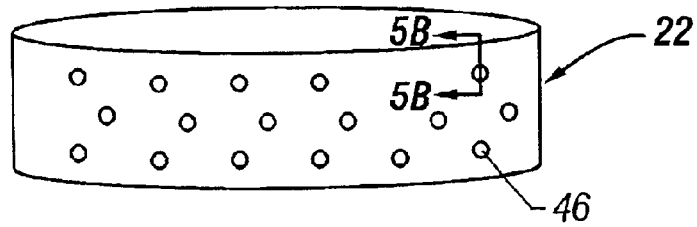
FIG. 5A is a schematic perspective view of another embodiment of the RFT support.

FIG. 5A is a schematic prospective view of another embodiment of the RFT reinforcement 22. In this embodiment, the RFT reinforcement 22 includes a relatively solid member that can be perforated with openings 46. The term "opening" and like terms are used broadly and include any aperture formed in the support and/or reinforcement, such as holes, slots, and other apertures. The term "perforate" and like terms are used broadly and include any method for forming openings in a material, such as molding, drilling, stamping, punching, melting, and other aperture forming methods.

Openings 46 allow the molding material to flow therethrough. Advantageously, the openings allow the molding material to flow through and around the reinforcement 22, so that the reinforcement 22 is at least partially encapsulated, and preferably substantially encapsulated, by the molding material. It is to be understood that the openings are optional and other embodiments may not have substantial openings.

As an example, the RFT reinforcement can be made from a relatively thin tube of material and processed by punching, drilling, cutting or otherwise forming openings 46. The material can be metal, composites, fiber reinforced composites, plastics, or other material that can be shaped into an essentially circular form. The terms "circular" and "cylindrical" are used broadly and include any shape forming a loop without hard corners, such as circles, ellipses and irregularly shaped geometric figures.

Figure 5B:
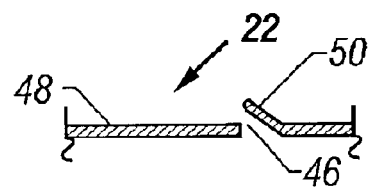
FIG. 5B is a partial schematic cross-sectional view of an opening formed in the embodiment shown in FIG. 5A.

FIG. 5B is a partial schematic cross-sectional view of an opening 46 formed in the RFT reinforcement shown in FIG. 5A. A surface 48 of the RFT reinforcement 22 has been perforated. In at least one embodiment, the surface 48 can be perforated, so that a tab 50 is disposed adjacent surface 48 to form the opening 46. The tab 50 can be useful in increasing a coupling force to subsequent molded material of the inner hoop 20 that surrounds the reinforcement, shown in FIGS. 1 and 2. The tab can also be useful is locating the reinforcement in a mold. The tab can extend in any direction, including toward the center of the reinforcement. In other embodiments, the opening 46 can be formed without producing a tab 50.

One property indicating suitable rigidity of the RFT reinforcement 22 is by measuring the deformation in a drop test. A test regimen for the reinforcements was to form a cylindrical reinforcement and determine the average diameter of the reinforcement from side to side when the reinforcement was lying horizontally in a state of rest. The reinforcement was rotated vertically, that is, the axis 23 that is shown in FIG. 4, was substantially perpendicular to gravity and elevated, so that a lower portion of reinforcement was at a height of about two meters above an uncushioned concrete floor. Other hard surfaces could also be used, such as wood, metal, or relatively rigid polymer surfaces. The reinforcement was dropped to test the amount of deformation occurring after the drop when the reinforcement was again lying horizontally in a state of rest.

Generally, the resulting shape was elliptical rather than circular. The dimensions of the resulting ellipse were measured after recovery when the reinforcement was again horizontal in a state of rest. The resulting dimension from side to side of the reinforcement after the drop generally decreased in a direction of the drop or increased in a corresponding amount in a direction perpendicular to the drop. A difference between either the decreased amount in one direction or the increased amount in the other direction compared to the original average diameter was used to calculate an average deformation percentage. The reinforcement was then reshaped into a circle prior to the next test. The test was repeated several times. Additionally, any delamination was noted as would cause the RFT reinforcement to be difficult to insert into a mold.

It was found that if the deflection percentage was about 20% or less, then the reinforcement generally had a rigidity that allowed the reinforcement to be inserted relatively easily into the support mold. Naturally, the deflection percentage could be more and still be usable. An advantageous percentage was about 10% or less, a more advantageous percentage was about 5% or less, and an even more advantageous percentage was about 1% or less. Some examples of various reinforcements that were prepared, tested, and inserted into the support mold in order to mold a support are described herein.

The reinforcement can be produced by several methods, some of which are described below. Generally, the reinforcement can be produced individually, or can be produced as from tubular members and individual reinforcements cut therefrom. As used herein, "cut" includes any type of severing of one piece from another. For example and without limitation, the cut could be performed by a cutter, such as a saw with one or more abrasive wheels.

FIGS. 6–10 show at least five variations of forming the reinforcements. Some of the variations include, for example, filament winding around a mandrel, wrapping a material around a mandrel, molding a reinforcement in a die, supplying longitudinal members in the winding of a reinforcement, and tangentially molding a reinforcement. Naturally, other methods are possible and the examples herein are non-limiting.

FIG. 6 is a schematic view of one system for producing a filament wound RFT reinforcement 22 shown in FIGS. 1–5B by a filament winding method and system. The system 60 includes a support mandrel 62, one or more reinforcement supplies 64, 66, and 68, such as drums or reels, a heater or other curing element(s) 76, and can include a cutter 80. The support mandrel 62 provides a surface about which filaments from the reinforcement supplies can be wound.

In at least one embodiment, one or more reinforcement supplies 64, 66 can be used to wind the filaments around the mandrel in a transverse direction at an angle to the center axis of the mandrel. The angle depends upon the speed of the rotating mandrel coupled with the speed at which the reinforcement supplies and/or material move along the axis of the mandrel. The angle would generally be between about 0 degrees and about 90 degrees and generally is between about 45 degrees and about 90 degrees. Further, an angle between intersecting filaments can be varied. For example, the transverse members 42, 42a shown in FIG. 4 can intersect at angles from greater than about 0 degrees to less than about 180 degrees.

In at least one embodiment, a reinforcement supply 68 can provide a substantially circumferential band of filaments. The band of filaments forms the one or more circumferential members 44, shown in FIG. 4. Generally, the circumferential member(s) 44 can be formed by winding the filaments at a large winding angle, i.e., almost perpendicular angle to the mandrel axis, to form a substantially continuous winding of filaments and spacings from multiple revolutions of the filaments around the mandrel, although any angle between about 0 degrees to about 90 degrees can be used. Thus, the circumferential member(s) 44 can be a continuous band that progressively is wound along the mandrel in at least one embodiment. Further, the circumferential member can be formed from one or more wraps, such as two, three, or more wraps to increase a hoop strength of the circumferential member. Alternatively, the filaments can be wound in discrete sections and cut to form a circumferential member and then the reinforcement supply 68 incrementally positioned to wind another circumferential member along the mandrel. Further, the filaments can be wound in multiple layers and/or widths to form a variety of thicknesses and widths of circumferential members and coupled to create the one effective layer described herein. Still further, the filaments can be wound at different rates of traverse, so that some filaments are wound closer together than other filaments. An example is described in reference to FIG. 6a.

Thus, the RFT reinforcement can be formed as an assembly of transverse and circumferential members. The geometry of the wound filaments on the mandrel can leave openings for moldable material to pass therethrough in molding the RFT support. Further, various lengths of the RFT reinforcement can be made on the mandrel, including single RFT reinforcements or multiple widths of RFT reinforcements that can be cut into individual RFT reinforcements through processing.

It is to be understood that variations of the winding are contemplated by the invention. For example, the various figures and methods described herein can use one or more of the reinforcement supplies, alone or in combination, to form various combinations of one or more transverse and/or circumferential members. Further, several reinforcement supplies are shown, but the number is not limiting and can vary depending on the various capabilities and production requirements. Also, the speeds and feeds of the various supplies can be varied as appropriate to produce desired thicknesses, spacings, shapes, and so forth, as would be apparent to those with ordinary skill in the art, given the understanding provided by the description of the invention contained herein.

In at least one embodiment, one reinforcement supply can be used to produce the transverse members by traversing the mandrel in one direction while winding and then traversing in another direction to produce another transverse member at a different angle. Further, the same reinforcement supply can be used to wind the transverse member or members and the circumferential members, for example by changing the traverse or rotation speeds for the transverse members compared to the circumferential members.

Such production capabilities in accordance with the teachings of the present invention and any associated software as could be performed by those with ordinary skill in the art, having been shown the underlying purposes and intent of the present invention, can be included with a production machine. One commercially available filament winding system is available from Sidewinder Filament Winding Systems of Laguna Beach, Calif., USA.

Returning to FIG. 6, one or more of the reinforcement supplies can pass through an applicator. For example, an applicator 70 is coupled to the reinforcement supply 64, an applicator 72 is coupled to the reinforcement supply 66, and an applicator 74 is coupled to the reinforcement supply 68. The filaments pass through the applicators and become coated with material, such as a thermoplastic or a thermoset polymer, and then are wound onto the mandrel. The coating material can include, for example and without limitation, an epoxy resin, including a vinyl epoxy ester resin, monomer, monomer mixture, polyurethane, styrene, polyester resin, phenolic resin, polymer, or other thermoset resins, thermoplastic resins, or combinations thereof. The applicators 70, 72 and 74 can include bath, spray, powder coating, extruders, and other forms of applying a material to a filament or cloth. An exemplary line of polymer resins is a line of thermoset vinyl epoxy ester resins known as Derakane® resins that are manufactured by The Dow Chemical Company, such as Derakane® 411, 510N, Momentum, and other resins suitable for coating a material and causing adherence to adjacent materials.

The coating materials, used in their appropriate curing system, are then allowed to cure to form a tubular member 78 through active methods, such as induced activation, or passive methods, such as allowing the cure in ambient conditions. For example, in active methods, a thermoplastic may need to be crosslinked by passing the mandrel through the curing element 76, such as a heater or a source of actinic radiation. Other catalytic reactions can occur without the necessity of heat or actinic radiation. Further, some resins can be cured with ultraviolet radiation, X-rays, and other activation methods of a curable polymer.

The tubular member 78 can be any length desired. For example, the tubular member can be formed a sufficient length to produce multiple sections and then cut into individual reinforcements. Alternatively, the tubular member can be formed to a sufficient length necessary for an individual reinforcement. Either alternative can use any of the methods described herein.

The tubular member 78 can be brought to a cutting station of the system 60 which includes a cutter 80. The cutter 80 severs one or more portions of the tubular member 78 to form a unitary, relatively rigid reinforcement 82. The tubular member can be cut on the mandrel or can be self-supporting and removed from the mandrel prior to cutting. The reinforcement 82 can then be used in forming the RFT support 16 shown in FIGS. 1–3.

A variation in the method described relative to FIG. 6 includes providing a thermoplastic film or other polymeric material on the mandrel 62 prior to winding the filaments from the reinforcement supply 64, 66, and 68. The filaments are wound onto the mandrel 62 without necessitating passing the filaments through the applicators 70, 72 and 74. Stated differently, the coating is applied to the filaments from the polymeric material on the mandrel. The wound and coated filaments can be cured as described above. Alternatively, the polymeric material can be provided after the filament material is wound on the mandrel by a number of methods, including applying a polymeric film over the filament material, spraying, dipping, or otherwise coating the material.

Another variation is to apply the polymeric material or other coatings to the filaments prior to winding the filaments. Such materials, known as pre-impregnated ("pre-preg") materials, can be partially cured and then subjected to final curing after assembly. The resin can be cured by reaction, actinic curing, such as ultraviolet or X-ray curing, heat, or other curing methods.

In one embodiment, the applicators can use a pultrusion method to apply a coating to the material. As is known to those in the art, a pultrusion method is essentially a continuous molding process. Reinforcing fibers, such as glass fibers, or other materials are pulled through an applicator such as a resin bath or thermoplastic extruder to apply a coating to the material. The material can then be used to form the RFT reinforcement. In such embodiment, one or more of the applicators 70, 72 and 74 could include the structure that pulls the material through the coating process.

Further, the process could be used to form a sheet of coated fibers. The resulting sheet could be wound around a mandrel, sealed upon itself to produce a tubular member, and optionally perforated. One or more RFT reinforcements can be cut from the tubular member.

FIG. 6a is a detailed schematic of one embodiment of transverse members 42, 42a and circumferential members 44, 44a, 44b and associated winding. A reinforcement supply 68 can be moved along the mandrel length to supply the reinforcement to the mandrel 62. The spacing and number of the circumferential members can depend on the total length of the final RFT reinforcement, structural characteristics, including the width of the reinforcement, costs, and other factors and, thus, can vary from time to time and from product to product.

Further, the filaments can be wound at different rates of traverse or rotational speeds, so that some filaments are wound closer together than other filaments. Thus, transverse members 42, 42a and circumferential members 44, 44a, 44b could be formed from the same material during a winding process, but formed at different winding traverses and/or speeds, so that the spacing is changed to produce the various members.

In at least one embodiment, one or more circumferential members 44a, 44b can be disposed adjacent the final edges of the RFT reinforcement after cutting the RFT reinforcement to length. Such edges can assist in placement, safety, and/or further processing. The circumferential members 44a, 44b can be formed at predetermined intervals, where a cutter 80 can cut the layer of bonded traverse and circumferential members into at least one RFT reinforcement 82, as also shown in FIG. 6. The members 44a, 44b can be formed with a relatively small gap or even no gap therebetween compared to gaps between adjacent circumferential members 44. Thus, when an RFT reinforcement is cut from the tubular member 78 between the members 44a, 44b, the RFT reinforcement is formed with a circumferential member adjacent each cut edge. The circumferential members on the edge of the reinforcement can offer improved edge smoothness.

One or more of the reinforcement supplies, such as supply 68, can wind the circumferential members 44a, 44b of reinforcement material on the mandrel in conjunction with winding the members 42, 42a by using the same material and changing the spacing between the various members. Alternatively, the members 44a, 44b can be formed as separate members from members 42, 42a.

In at least one embodiment, the circumferential members 44a, 44b can be formed from a single circumferential member with or without a small gap between the majority of the windings. If the members are formed together, then the combined width of the members can be incrementally wider than a circumferential member 44, such as twice the width. The cutter 80 can cut the combined circumferential member to produce an RFT reinforcement that has a circumferential member adjacent the cut edge(s) that can correspond in width to the circumferential member 44. The above embodiments are merely exemplary and the width, quantity, and placement of the circumferential members 44a, 44b can vary relative to the circumferential member 44.

Figure 7:
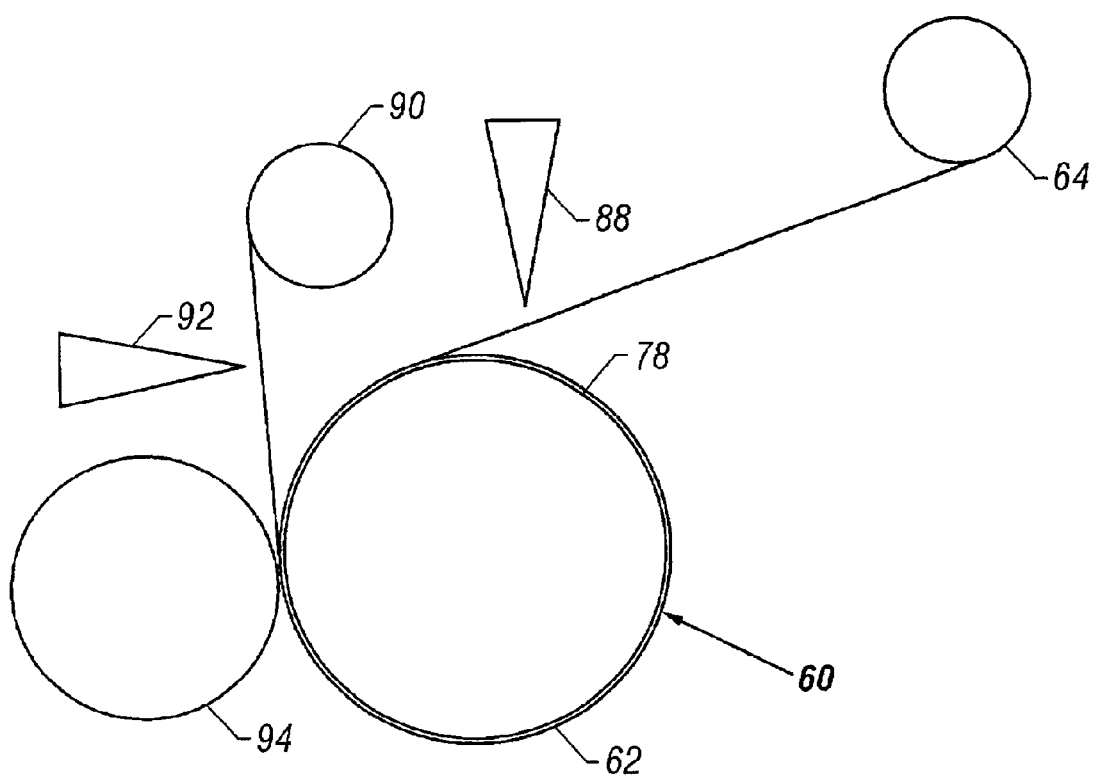
FIG. 7 is a schematic view of another embodiment of a system for producing an RFT reinforcement by wrapping reinforcement material around a mandrel.

FIG. 7 is a schematic view of another embodiment of a system for producing an RFT reinforcement by wrapping reinforcement material around a mandrel. A reinforcement supply 64 provides reinforcement material, such as one or more filaments, cloths, or other material, to a mandrel 62. The reinforcement material is wrapped one or more times about the mandrel and can be cut by cutter 88. A polymer supply 90 provides a polymeric material in a form of, for example, a thermoplastic film, a molten web, an adhesive tape, or other suitable media for application to reinforcement material. The polymeric material can be wound around the mandrel with the reinforcement filament from the reinforcement supply 64. The polymeric material can be cut by cutter 92 to an appropriate length. The reinforcement filament and polymer can be pressed together by a roller 94 placed against the mandrel 62. The materials form a tubular member 78 which can be cured and if necessary cut to an appropriate length to form a RFT reinforcement, as described in FIG. 6. The order of the materials can be reversed, so that the filament is wrapped after the polymer. Thus, the materials that are wrapped on the mandrel can be wrapped directly or indirectly on the mandrel herein. Further, the polymer supply 90 can provide a fluid, such as in a spray, and apply the fluid to the mandrel and/or reinforcement.

A prefabricated scrim material having apertures formed therein can be used for the RFT reinforcement material. The material can be wrapped more than once around the mandrel and, thus, the apertures on the scrim material might not align with the underlying apertures of the previous layer. The misalignment can cause unintended restricted flow of material through the reinforcement, so that the structural integrity of the molded RFT support can be affected. Therefore, a mandrel can be used with indexed "teeth" to align fibers, woven material, or other material being wound or otherwise placed on the mandrel. Alternatively, sufficiently large apertures can be used, so that the apertures will not become unduly restricted through the various layers.

Alternatively, the material can be treated with a pressure sensitive adhesive around a mandrel, causing the material to be coupled to itself. In this method, at least one complete wrapping of material is used to allow some surface area by which the material can adhere to itself to form a tubular member and ultimately the RFT reinforcement.

Figure 8:
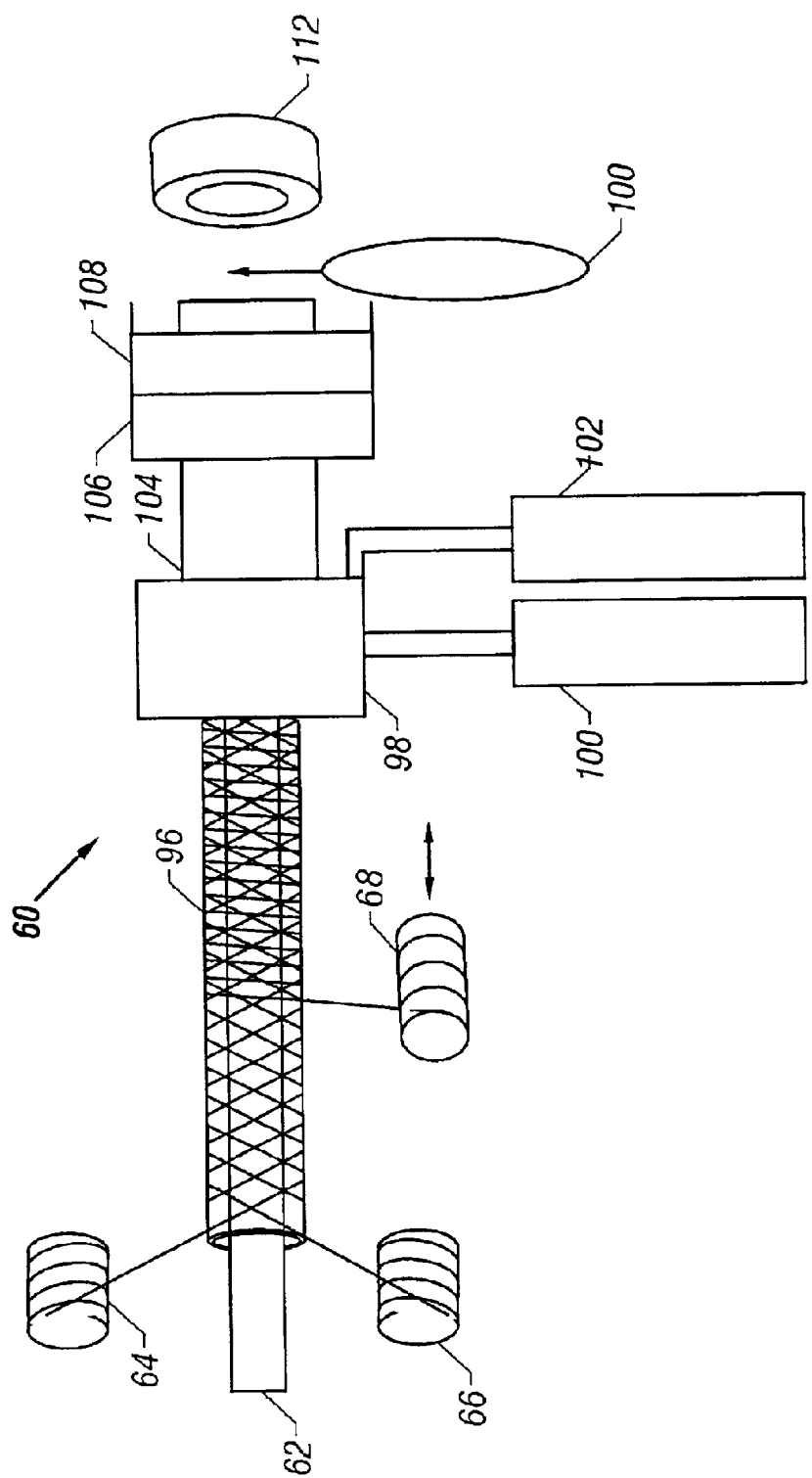
FIG. 8 is a schematic view of another embodiment of the system for molding an RFT reinforcement.

FIG. 8 is a schematic view of another embodiment of the system for molding an RFT reinforcement. The system 60 includes a support mandrel 62 and one or more reinforcement supplies 64, 66. The reinforcement supply provides reinforcement material, such as filaments or cloth, to wind around the mandrel 62 to produce a wound portion 96. The wound portion 96 is supplied to a profile extrusion die 98 having an inner and/or outer die. An extruder 100, for example, a thermoplastic extruder, is coupled to the profile extrusion die 98 for providing molding material as a coating thereto. A blowing agent supply 102 can also be coupled to the profile extrusion die 98. The profile extrusion die provides the moldable material to the wound portion 96 in a controlled shape and produces a tubular member 104. The tubular member 104 can be conveyed through a cooler 106 that can also include support for the molded RFT reinforcement in the cooling process. If desired, the tubular member 104 can pass through a perforator 108 to provide perforations for the tubular member 104, so that moldable material used to manufacture the RFT support 16 shown in FIG. 1 can flow therethrough. The tubular member 104 can progress to a cutting station having a cutter 110 to cut a portion of the tubular member into one or more RFT reinforcements 112. The cut piece can be further shaped via compression or thermal shaping if necessary. The order of the profile extrusion die, cutter, cooler, and perforator can be varied to produce the RFT reinforcement.

A variation of the above method can include forming a combination of extruded or prefabricated thermal plastic films with reinforcing fabric in a relatively flat orientation. The film and fabric can be wound by being rolled into a tube using shaping equipment (not shown).

Figure 9:
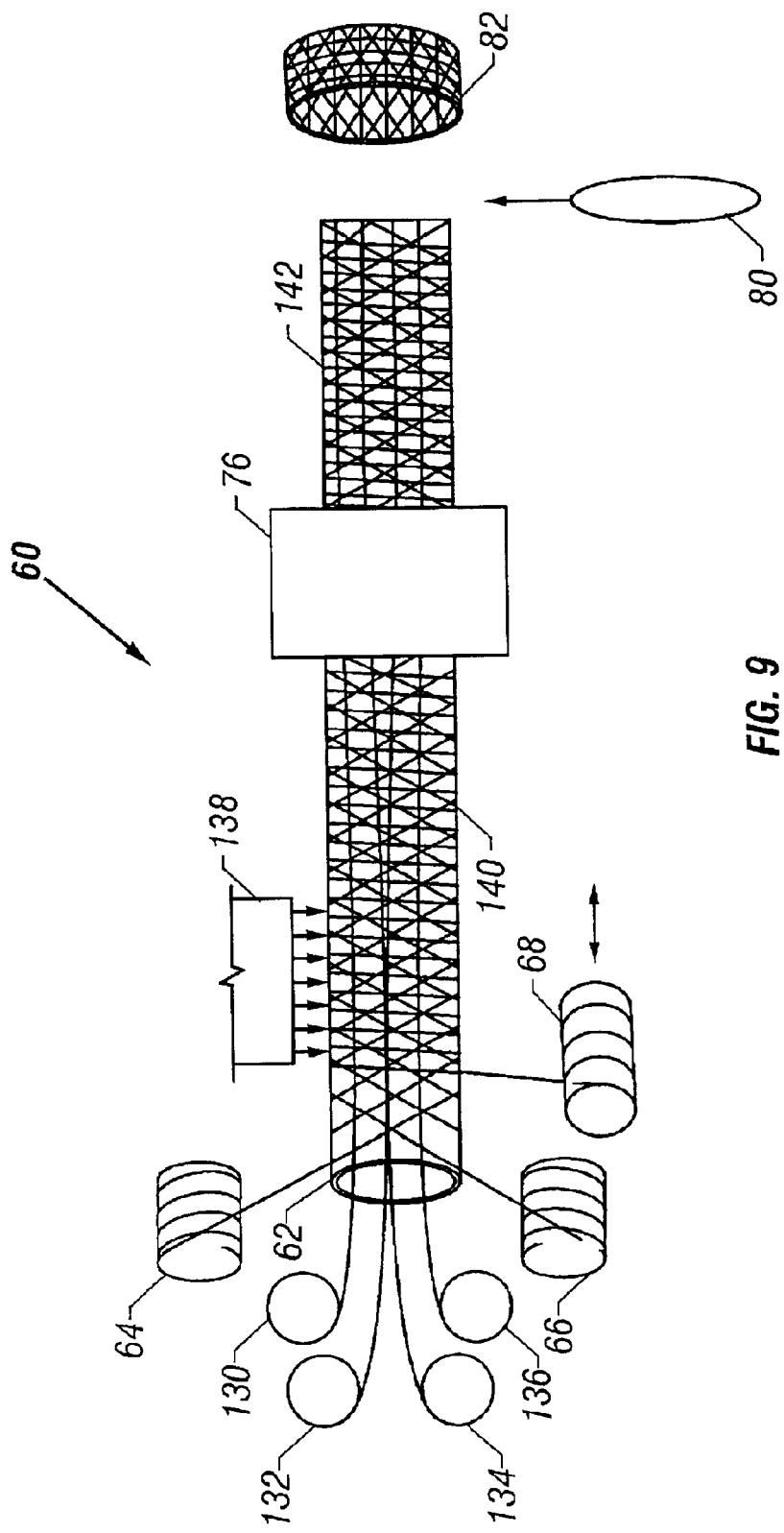
FIG. 9 is a schematic view of another embodiment of the system for producing a reinforcement having longitudinal members.

FIG. 9 is a schematic view of another embodiment of the system 60 for producing a reinforcement 82 having longitudinal members. The system is similar to the system described in FIG. 6. The system includes a mandrel 62 about which is formed a matrix of wound filaments. One or more reinforcement supplies 64, 66 provide one or more transverse members of filament material around the mandrel 62. Further, one or more reinforcement supplies 130, 132, 134, and 136 provide one or more longitudinal members. Although various numbers of reinforcement supplies are shown, the number can vary from one to any number as appropriate in this and any other embodiment disclosed herein.

The mandrel 62 can include a film, a molten web, or adhesive tape to maintain the location of the filaments prior to curing. In at least one embodiment, the mandrel does not rotate relative to the reinforcement supplies 130, 132, 134 and 136 while the longitudinal members are placed. In other embodiments, one or more of the reinforcement supplies can rotate about the mandrel. Still further, in other embodiments, both the mandrel and the reinforcement supply or supplies can both rotate.

The reinforcement supplies 64 and 66 provide filament material to the mandrel as the mandrel and/or the reinforcement supplies 64, 66 are rotated relative to the mandrel. The longitudinal members can include a fusible polymer to hold transverse members in position. Alternatively, an applicator 138 is provided to spray, flow, or otherwise apply a material to the wound portion 140. The wound portion is allowed to cure. For example, if a thermoplastic is used, the wound portion 140 can be placed in a curing element 76 to melt, fuse, or crosslink the thermoplastic. The resulting tubular member 142 can be removed from the mandrel and cut into the discrete sections to form the RFT reinforcement 82.

Figure 10:
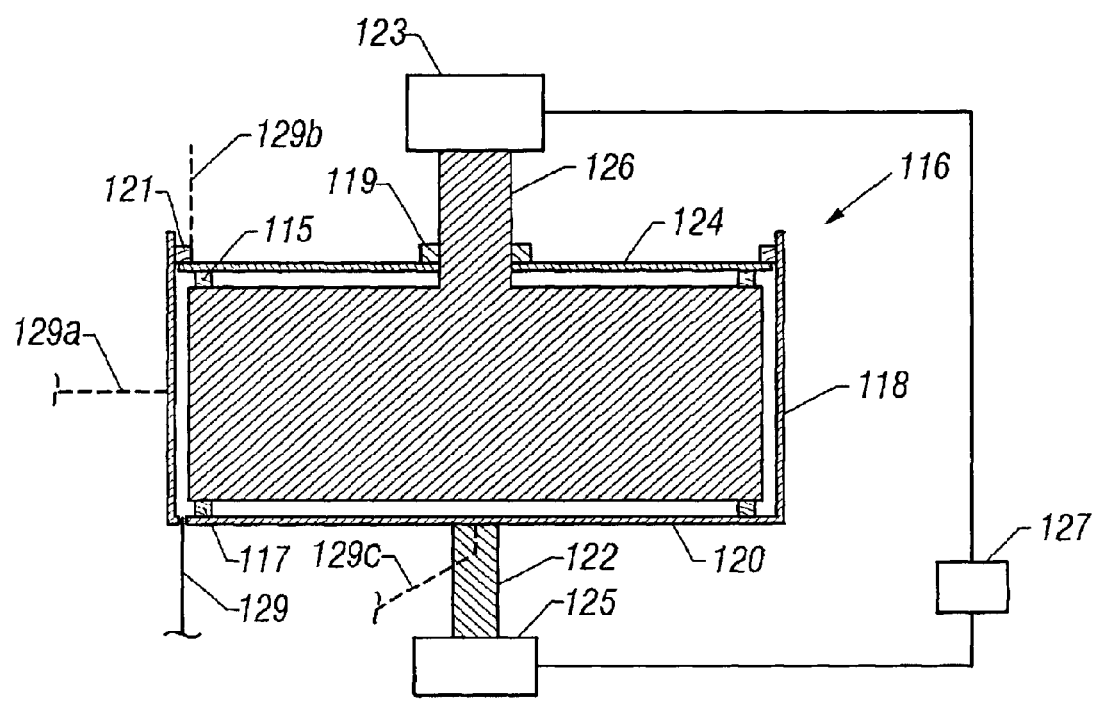
FIG. 10 is a schematic view of another embodiment of a system for producing an RFT reinforcement using a tangential molding process.

FIG. 10 is a schematic view of another embodiment of a system for producing an RFT reinforcement using a tangential molding process. Generally, the tangential molding process can use a thermoplastic or other polymeric material that is injected into a mold. One or more portions of the mold can rotate so that the injected material is forced around the mold's perimeter. The rotation causes the polymer to flow around the mold to align entrained filaments along a circumference of the mold. The molded part can be allowed to cool and solidify and the RFT reinforcement removed from the mold with the filaments in appropriate alignment. Openings in the molded part can be formed to allow molding material for the RFT support to flow therethrough in the subsequent support molding process.

A mold 116 can include one or more sides 118, a bottom 120, and a top 124. A support 122 can support one or more portions of the mold 116. A shaft 126 can be inserted through the top 124. One or more seals, such as seals 115, 117, 119, and 121, can be disposed at various interfaces between the shaft 126, top 124, sides 118, and bottom 120. The seal(s) can include a bearing. One or more motors 123, 125 can be used to rotate and/or translate portions of the mold. The motors can be coupled to a controller 127 for control thereof. An injection point 129 coupled to one or more portions of the mold 116 can be used to introduce the molding material into the mold.

In operation, the molding material is introduced into the mold and the shaft can be rotated. The fluid properties of the molding material in conjunction with the rotating shaft cause the molding material to accumulate adjacent the sides 118. Filaments entrained in the molding material can also become aligned around the circumference of the sides 118. The molded part is allowed to solidify and removed from the mold. For example, the bottom 120 can be separated from the top 124 and the molded part removed from the mold.

Variations are possible. For example and without limitation, the shaft 126 can be stationary and one or more other portions of the mold 116, such as the sides 118, can rotate around the shaft. Further, the shaft and the one or more other portions of the mold can rotate together or in opposite directions. The shaft 126 can be inserted through the bottom 120, the sides can be coupled to the top 124, the ports can be in one or more alternative positions such as 129a, 129b, 129c or combinations thereof. Multiple injection points can be used. The angles of the injection points can also vary. For example, one or more injection points can be angled along the side of the mold to assist in prealigning the material, as it is introduced into the mold. Injection is used broadly and includes herein any known method of introducing a molding material into a mold. Other equipment (not shown), such as heaters, coolers, and electrical controls could vary the production of the reinforcements. The schematic is used to illustrate a tangential molding method and is not limiting of the underlying method of a tangential molding method, as many variations are possible.

It is to be understood that a similar result can include using a tangentially directed port(s) with or without the mold or shaft rotating. For example, a thermoplastic can be injected into the mold in a direction that forces the polymer to flow around a reinforcement hoop to circumferentially align entrained filaments. As the mold is filled with material, the filaments can flow around the circumference of the mold. The molded part can then allowed to solidify and the RFT reinforcement removed from the mold with the fibers in position. For the purposes of this disclosure, tangential molding is meant to include such variations.

Colored Indicator for RFT Support

As described herein, the RFT supports can vary by manufacturer, size, style, and other attributes. Shipping, installation, repair, and other post-manufacturing uses can benefit from some visual indicator of one or more of the attributes of the RFT support to avoid confusion with other RFT supports. The present invention provides a heretofore unknown and unused colored indicator(s) to indicate one or more attributes of the RFT support.

Figure 11:
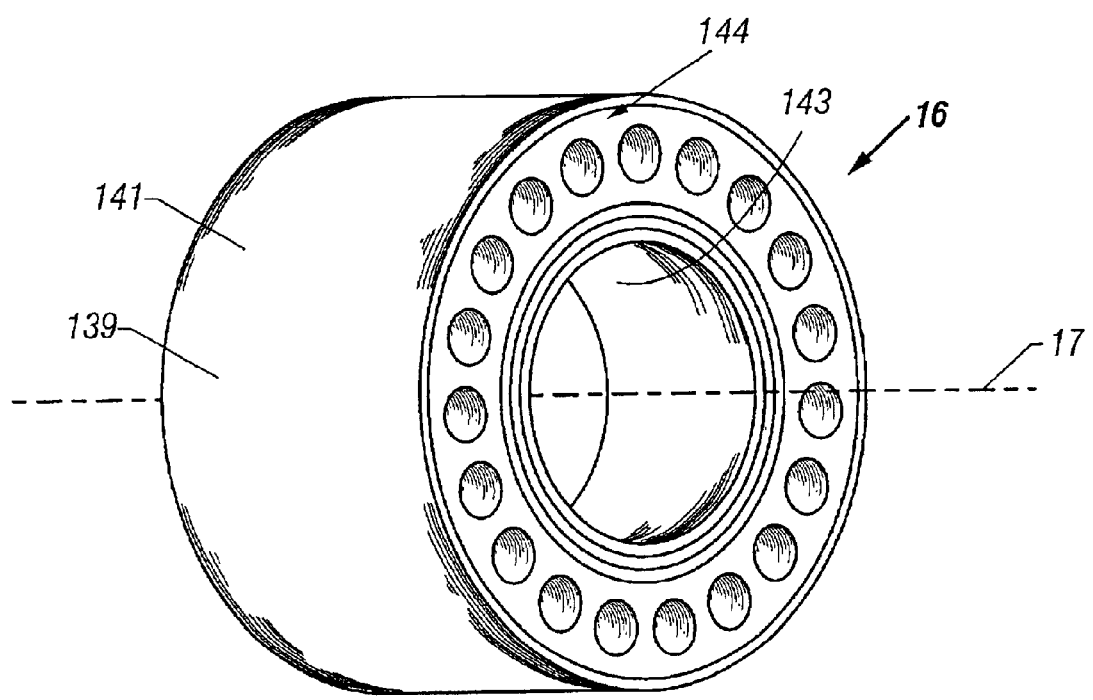
FIG. 11 is a schematic perspective view of a RFT support having a colored indicator.

FIG. 11 is an exemplary RFT support 16 having an axis 17, an outer periphery 141, an inner periphery 143, side walls 144, and a preselected colored indicator 139. In some embodiments, the colored indicator can be applied to the RFT support on one or more surfaces of the support. In at least one embodiment, the colored indicator can be incorporated into materials used to form the RFT support. For example, the colored indicator can be formed into the RFT support during a molding process of the RFT support. The colored indicator could be mixed with the RFT support components to produce a colored RFT support.

Where the RFT support is a polyurethane, it can be formed, for example and without limitation, by a reaction injection molding (RIM) process. This process is well established in the art and consists of filling a closed mold with highly reactive liquid starting components within a very short time, generally by using a high output, high pressure dosing apparatus after the components have been mixed. In one embodiment, the reaction injection molding process consists of the use of at least two liquid streams (A) and (B) which are impingement mixed under moisture free conditions. Stream A contains the organic polyisocyanate, typically a liquid polyisocyanate. Stream B contains the isocyanate-reactive component which typically is a polyol and/or an amine polyether, and usually a chain extender containing amino and/or hydroxyl groups. The mixture is then allowed to cure within the mold to render the finished product. The colorant can be added to either the "A" component or the "B" component. Alternatively, the colorant could be added to both the "A" component and the "B" component.

The coloring can be visually apparent on one or more surfaces of the RFT support. Further, the coloring could be substantially uniform across one or more surfaces of the RFT support, especially if the coloring is substantially uniformly mixed with the components. The coloring indicator can be a stable or inert material, such as a dye, or can be a reactive ingredient that can be activated chemically, electrically, photochemically, thermally, or by any other method of causing an ingredient to react. Further, the reactive ingredient can react with components used in the molding process of the RFT support to produce one or more colors.

FIGS. 12a–12f are exemplary RFT supports having variations of colored indicators. The colored indicator can be formed, applied thereto, or otherwise coupled with the RFT support in addition to or in lieu of the colored indicator being incorporated into the RFT support as described above. The colored indicator can be coupled to one or more surfaces of the RFT support. In some embodiments, the RFT support can be substantially covered with the colored indicator. A substantial coverage can also form a barrier for gaseous or liquid fluids or other substances affecting the RFT support. In some embodiments, the colored indicator can include a single representation or a plurality of representations of markings, symbols, or other visually apparent indicia to indicate the one or more attributes of the RFT support.

The colored indicator can be a uniform color that is coupled to one or more surfaces of the RFT support. Alternatively, the colored indicator can include variations in colors. For example, a single indicator can be used with different colors indicating different attributes, such as manufacturer, size, or other attributes. More complicated schemes can be used with, for example, multiple colored indicators having multiple colors that can be used to indicate one or more attributes.

The colored indicator can also indicate attributes of use, condition, wear, and other operation-related attributes. For example, a colored indicator can be applied to the RFT support and then change colors when one or more operation attributes occur, such as an operating condition(s) or an event(s), that would cause a response from the colored indicator. In at least one embodiment, a colored indicator can change colors when a mounted tire deflates and rolls against the RFT support during use. The wear could cause increased heat, friction, or other phenomena and cause the colored indicator to temporarily or permanently signal a change. Similarly, colored indicators can be used to indicate operating wear, unusually high stress, and other operating conditions.

Further, a colored indicator can be used to indicate one or more degrees of operating conditions, such as and without limitation, a time based or stress based intermittent use, average use, and intensive use. Such indications can be based, for example, on the amount of heat or other operating conditions produced during one or more uses. Further, multiple colored indicators can be used that react to varying degrees of attributes to indicate a range of conditions. Similarly, multiple colored indicators can be used to indicate multiple operation-related attributes. Examples of commercially available signaling paints that can be used for this invention include Temp-Alarm by Tempil, Inc. of South Plainfield, N.J., USA and Thermo-Paint by Samkwang Corp. of Buchon-City, Kyonggi-Do, Korea.

The colored indicators 150a –f can be formed, affixed, placed, or otherwise coupled to the RFT support on one or more surfaces of the support. For example, the colored indicators can be coupled to the outer periphery 141, to the inner periphery 143, to side walls 144, or a combination thereof.

Still further, the style, number, shape, position and angle with respect to the axis 17 and other datums, depth, width, and/or placement of the colored indicator on the RFT support can vary and the examples shown are not intended to be limiting but merely representative of some of the possible variations. Other variations can and would exist. The variations can include the above list and other variations, such as dashes, stripes, geometric patterns, and so forth.

The colored indicators can be applied after the molding of the RFT support in any conventional method. For example and without limitation, the colored indicator can be applied by gravure processes, rolling, spinning, flowing, brushing, electrostatic deposition, dipping, spraying, immersing, powder coating, or other coating/painting methods. Optionally, the colored indicator can be cured on or with the RFT support. The colored indicator can also be applied in the RFT support mold prior to molding, during molding, or after molding.

The following examples are non-limiting and are intended as merely representative possibilities of aspects of the invention disclosed herein.

EXAMPLE 1

Production of an RFT Support

The following is one example of the production of an RFT support. Naturally, other procedures are available and the example is intended to include only one of many possibilities. A pre-fabricated RFT reinforcement was inserted into the inner radius of an RFT support mold prior to closing the mold. The RFT reinforcement can be held in position in the mold by pins or other locating devices. The locating devices can be coupled to the mold or to the RFT reinforcement. In at least one embodiment, the locating devices can be an integral part of the RFT reinforcement, as when tabs or other elements extend from the RFT reinforcement.

An RFT support was reaction injected molded (RIM) into this mold, using a polyurethane-forming, two component, reaction injection molding formulation based on methylene diphenyl isocyanate (MDI), polyether polyols, diamine chain extender, a catalyst and a surfactant. The polyol formulation and the isocyanate prepolymer were metered into an impingement mixhead using a metering machine. The reacting liquid passed from the mixhead into a centered, bottom, axially-oriented sprue. The liquid was then directed from the sprue into multiple spoke runners in this example. The spoke runners fed a circumferential runner, located on a lower inner diameter relative to the RFT support being molded. The circumferential runner allowed the reacting polymer to flow over a film gate into a lower portion of the RFT support being molded. The RFT support mold cavity was oriented substantially horizontally, that is, with the axis approximately parallel to gravity during the mold fill. The top of the mold included release vents for the expulsion of air. The reacting polymer filled the mold from bottom to top. The mold was held at a temperature of about 70° C. during introduction of the reacting polyurethane. The mixhead was closed upon filling the mold, and the polymer was allowed to cure for 45 seconds. The mold clamp was opened and the RFT support removed.

The mold was used to form RFT supports using RFT reinforcements described below in the comparison runs and the examples of the invention.

COMPARATIVE EXAMPLE 1

RFT Reinforcement Formation and Rigidity Test
AF-45 Cloth with No Binder A reinforcement was prepared by wrapping a 9 centimeter-wide strip of "AF-45" fiberglass/stainless steel scrim cloth around a 48 cm diameter cylindrical mandrel. The AF-45 material is available from d'A. Chomarat & Cie in France. The fiberglass/stainless steel content of the cloth was about 94%. The AF-45 fiberglass cloth forms a generally square mesh pattern having approximately 8 mm by 8 mm openings. To form the openings in the mesh, the AF-45 cloth is made from several longitudinal 1.5 mm wide fiber bundles that are about 0.3 mm thick with an entwined stainless steel wire. The stainless steel in the cloth helps add support to the shape. Lateral fiber bundles of about the same dimensions cross the longitudinal bundles. The AF-45 cloth generally has a weight of about 176 grams per square meter.

The reinforcement was prepared using five layers wrapped around the mandrel to provide a desired amount of hoop stiffness, described herein. Each layer had previously been heated to thermally bond together to form the AF-45 cloth of crossing filaments, but there was no substantial bonding between layers. Using the test described above, the first drop resulted in a 15% average deformation, the second drop resulted in a 30% average deformation, and the third drop resulted in a 23% average deformation for a combined average deformation of about 23%. Further, after the third drop, two of the layers from the reinforcement delaminated.

Another reinforcement was prepared in the same manner and was inserted into an RFT support mold. The reinforcement took about 45 seconds of manual effort to insert, at least in part because it easily loses its shape and can delaminate.

COMPARATIVE EXAMPLE 2

RFT Reinforcement Formation and Rigidity Test

AF-45 Cloth with Sprayed Binder Another reinforcement was prepared using AF-45 scrim cloth. Approximately five layers of AF-45 cloth was wrapped around a mandrel having an approximate diameter of 50 cm. The outward side of the first 15 cm of the cloth was lightly sprayed with 3M Super 77 Spray Adhesive. Similarly, the inward side of the ending 15 cm was lightly sprayed with the same adhesive. The belt was dried for about 15 minutes at ambient conditions after removal from the mandrel. Drop tests were conducted on the reinforcement belt at the two meter altitude. The belt was measured in width and thickness at approximately four quadrants around the diameter. After each drop, the belt was examined and measured with the results reported below in Table 1. The belt was so flexible that it deformed by about 95% in each of the drop tests and thus could add complexity and difficulty to installation and production of a RFT support.

TABLE 1

| AF-45 BELT | | |
| --- | --- | --- |
| Belt Status | Height (in) | Thickness (mm) |
| Original | 4 | 1.52 |
| | 3⅝ | 1.42 |
| | 3⅝ | 1.11 |
| | 3⅝ | 2.14 |
| Drop #1 | 4 | 1.52 |
| | 3⅝ | 13.3 |
| | 3⅝ | 1.7 |
| | 3⅝ | 1.63 |
| Drop #2 | 4 | 9.65 |
| | 3⅝ | 26.71 |
| | 3⅝ | 1.12 |
| | 3⅝ | 2.52 |
| Drop #3 | 4 | 2.75 |
| | 5 | 50.26 |
| | 3⅝ | 9.14 |
| | 3⅝ | 2.52 |
| Drop #4 | 4 | 2.34 |
| | 4½ | 32.92 |
| | 9 | 127 |
| | | 177.8 |
| Drop #5 | 4 | 2.55 |
| | 5½ | 165.1 |
| | 9¼ | 127 |
| | | 139.7 |

In the original configuration, the belt was very flexible and had an initial height of about 3⅝ inches, as measured when the belt is laying flat and the center axis 23, shown in FIG. 4, is relatively vertical. The belt had an initial thickness of about 1.1 mm to about 2.1 mm.

After Drop #1, the belt retained the approximate height, but the first layer was partly delaminated in at least one section with the thickness of that section being about 13 mm. In other words, the delamination caused an outer layer to become detached from the other layers so that in a resting state, the thickness of the layers was about 13 mm without recompressing the layers back together.

Drop #2 caused further delamination and resulted in the belt thickness increasing to about 27 mm. Further, other portions of the belts began delamination with a thickness of about 10 mm.

Drop #3 resulted in a height change such that the normal height of 3⅝ inches in at least one portion of the belt to about 5 inches. Further, the thickness increased to about 50 mm.

After Drop #4, the height had increased to about 9 inches and substantially all of the layers had delaminated, except for one section with the adhesive. The thickness varied from 2.3 mm to about 180 mm.

Drop #5 caused further delamination throughout other portions of the multiple layered reinforcement.

COMPARATIVE EXAMPLE 3

RFT Reinforcement Formation and Rigidity Test R-5 Cloth with Adhesive

Another reinforcement was prepared by wrapping a 9 cm wide strip of R-5 fiberglass scrim cloth, available from d'A. Chomarat & Cie in France, around the 48 cm diameter cylindrical mandrel. The R-5 fiberglass cloth forms a generally rectangular mesh pattern having approximately 7 mm by 6 mm to 10 mm by 6 mm openings. To form the openings in the mesh, the R-5 cloth is made from several 1.8 mm wide longitudinal fiber bundles that are about 0.7 mm thick and crossing fiber bundles of about 2.8 mm wide and 0.4 mm thick. The fiberglass content of the cloth is about 66%. The R-5 scrim cloth generally has a weight of 388 grams per square meter, over twice the weight of the reinforcement described in Comparison Run 1 of the tests.

The scrim cloth was wrapped twice around the mandrel to obtain a relatively equivalent hoop stiffness as the five layers of AF-45 cloth in Comparative Example 1. Only the ending 15 cm was sprayed with a light coating of 3M Super 77 Spray Adhesive to apply a pressure sensitive adhesive. The coated scrim section was then used to bond the end into place over the previous layer. The same drop test was performed. The first and second drop test had an average deformation of 9%. On being dropped the third time, the reinforcement delaminated along the inner layer.

EXAMPLE 1

RFT Reinforcement Formation and Rigidity Test Filament Wound RFT Reinforcement with Coating A unitary, rigid RFT reinforcement was prepared using a filament winding system. The filament wound RFT reinforcement was constructed similar to the construction shown in FIG. 4 having transverse members and circumferential members. Generally, the filaments were wound around about a 50 cm diameter mandrel, a binder coating applied to the filaments and cured to form a tubular member having one effective layer, and the tubular member cut into one or more RFT reinforcements.

More particularly, the filament wound RFT reinforcement was made from 450 yield, that is, about 450 yards per pound, fiberglass and a binder, such as an epoxy Derakane® resin was applied. The binder and fiberglass yield can vary. The RFT reinforcement tubular member was made on a filament winding machine that utilizes a computer program to wind the fiberglass filament around a steel mandrel. For this example, the mandrel has an outer diameter of 491 mm so that the inside diameter of the resulting RFT reinforcement has a corresponding diameter. The program initiated winding a helical (transverse members) wind(s) around the mandrel and then winding hoops (circumferential members) over the helical and around the same mandrel with spacing between the hoops. The helical portion of the program typically resulting in transverse members having either 1 inch or 2 inch spacing between adjacent transverse members with an angle typically of 72 to 78 degrees, although it could be adjusted to any angle.

The fiberglass strand was laid on the mandrel at a linear speed of 150 to 180 feet per minute (fpm) while winding both the helical winds and the hoop winds around the mandrel. The mandrel rotated at a speed of about 25 to about 45 revolutions per minute (rpms). For this particular example, the transverse members or helical members were wound with the filament applied at a traverse speed along the longitudinal axis of the mandrel at about 2 –10 fpm with a mandrel rotational speed of about 30 –35 rpms. The circumferential members or hoops could be wound at a traverse speed along the longitudinal axis of the mandrel at about 0.05 –1.0 fpm with the mandrel having a rotational speed of about 30 –35 rpms. The resulting pattern yielded elongated trapezoidal or hexagonal spacings between the members of about 25 –60 mm lengthwise and about 4 –8 mm crosswise, with an average of about 30 mm by about 6 mm. In one embodiment, the reinforcement was made with 8 hoops, and each hoop had about 9 strands of 450 yield fiberglass per hoop, although other numbers, sizes, and spacings of hoops could have been chosen. In this example, the spacing between the hoops was about ⅛ inch to about ⅜ inch.

When formed, the tubular member was about five feet long and was cured and removed from the mandrel. The tubular member was cut squarely in sections to yield an RFT reinforcement having a height of about 110 mm when laying flat on a table top. In this non-limiting example, the tubular member was made during this winding program using one strand of fiberglass for the winding of hoops and helical winds. The computer program had the strand go back and forth to complete the winding on the mandrel. Multiple strands of fiberglass can also be used during the winding portion of this program.

Similar drop tests were carried out from the two meter altitude.

TABLE 2

| FILAMENT WOUND BELT | | | |
|---|---|---|---|
| Belt Status | Diameter (in) | Height (in) | Thickness (mm) |
| Original | 19½ | 3⁷⁄₁₆ | 2.22 |
| | | | 3.86 |
| | | | 2.84 |
| | | | 1.44 |

No substantial change was observed after the belt was dropped five times from the two meter altitude. The diameter, height, and thickness were relatively constant. There was no substantial delamination and no substantial deformation, so that the reinforcement maintained its structure as a rigid, one effective layered embodiment. The diameter was about 19½ inches, the height was about 3⁷⁄₁₆ inches, and the thickness varied from about 1.4 mm to about 3.9 mm around the periphery.

EXAMPLE 2

RFT Reinforcement Formation and Rigidity Test Filament Wound Reinforcement with Coating An RFT reinforcement was prepared from fiberglass filament by passing the filament through an epoxy resin bath and then winding the filament onto a 48 cm diameter mandrel using a computer-controlled filament winding machine. The mandrel was placed in an oven at about 70° C. for one hour to cure to form one effective layer. The resulting filament wound tube was removed from the mandrel and cut into about 8 cm long sections using a band saw. The fiberglass content of the resulting RFT reinforcement was about 62% and about 35% binder applied to the fiberglass filament. The RFT reinforcement had a weight of about 550 grams per square meter. In at least one embodiment, the manufactured RFT reinforcement has a mass of about 160 grams to about 200 grams with about 180 grams being an average. The values of density, mass, and other parameters are exemplary and non-limiting and can vary as appropriate given different applications and different design parameters.

The drop test for all three drops was an average of less than 10% deformation and generally about 6%. The structure did not delaminate after repeated handling. The reinforcement was inserted into an RFT support mold in about 5 seconds by hand due to its preshaped, substantially rigid structure.

While the foregoing is directed to various embodiments of the present invention, other and further embodiments can be devised without departing from the basic scope thereof. For example, the various methods and embodiments of the invention can be included in combination with each other to produce variations of the disclosed methods and embodiments. Discussion of singular elements can include plural elements and vice-versa. Also, any directions shown or described such as "top," "bottom," "left," "right," "upper," "lower," and other directions and orientations are described herein for clarity in reference to the figures and are not to be limiting of the actual device or system or use of the device or system. The device or system can be used in a number of directions and orientations. Further, the order of steps can occur in a variety of sequences unless otherwise specifically limited. The various steps described herein can be combined with other steps, interlineated with the stated steps, and/or split into multiple steps. Additionally, the headings herein are for the convenience of the reader and are not intended to limit the scope of the invention.

Further, any references mentioned in the application for this patent as well as all references listed in the information disclosure originally filed with the application are hereby incorporated by reference in their entirety to the extent such may be deemed essential to support the enabling of the invention(s). However, to the extent statements might be considered inconsistent with the patenting of the invention (s), such statements are expressly not meant to be considered as made by the Applicants.

What is claimed is:

1. A method of mrnzfacturing a run flat tire (RFT) support, comprising:
    a) placing at least one RFT reinforcement into a portion of an RFT support mold, the reinforcement being formed from one or more flaments and being unitary and having a rigidity sufficient to deform about 20% or less when dropped from about two meters high to a hard surfane when an axis of the RFT reinforcement is substantially perpendicular to gravity;
    (b) injecting a moldable elastomer or elastomer-forming material into the mold;
    (c) flowing the moldable material through at least a portion of the reinforcement; and
    (d) allowing the moldable material to at least partially solidify to form the RFT support.

2. The method of claim 1, wherein planing the RFT reinforcement into the portion of the mold occurs in about 15 seconds or less from the time of positioning the RFT reinforcement over the mold to the tim. of inserting the reinforcement into a cavity of the mold.

3. The method of claim 1, wherein the RFT reinforcement has a rigidity sufficient to defonn about 10% or less when dropped from about two meters high to a hard surface when an axis of the reinforcement is substantially perpendicular to gravity.

4. The method of claim 1, wherein the reinforcement comprises filaments formed at a first transverse angle, a second transverse angle, and a circumferential angle.

5. The RFT reinforcement of claim 1, wherein the reinforcement comprises one or more transverse members and one or more circumferential members.

6. The RFT reinforcement of claim 5, wherein the RFT reinforcement is cut from a tubular member having a length equal to at least one reinforcement and at least one of the circumferential members have an increased width in proximity to a place on the tubular member to be cut.

7. The RFT reinforcement of claim 5, wherein the RFT reinforcement is cut from a tubular member having a length equal to at least one reinforcement and the tubular member has at least two circumferential members in proximity to a place an the tubular member to be cut.

8. The RPT reinforcement of claim 5, wherein at least one of the transverse or circumferential members has an increased thickness relative to another member.

9. The RFT reinforcement of claim 1, wherein the RFT reinforcement comprises one or more coated filaments formed into a cylindrical shape.

10. The RFT reinforcement of claim 1, wherein the RFT reinforcement comprises tabs extending from a surface of the reinforcement.

\* \* \* \* \*